(12) United States Patent  
Hiramoto et al.

(10) Patent No.: US 11,606,334 B2  
(45) Date of Patent: *Mar. 14, 2023

(54) COMMUNICATION SECURITY APPARATUS, CONTROL METHOD, AND STORAGE MEDIUM STORING A PROGRAM

(71) Applicant: PANASONIC INTELLECTUAL PROPERTY CORPORATION OF AMERICA, Torrance, CA (US)

(72) Inventors: Takuji Hiramoto, Osaka (JP); Tatsumi Oba, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 126 days.

This patent is subject to a terminal disclaimer.

(21) Appl. No.: 17/197,413

(22) Filed: Mar. 10, 2021

(65) Prior Publication Data

US 2021/0203638 A1 Jul. 1, 2021

Related U.S. Application Data

(63) Continuation of application No. 16/047,020, filed on Jul. 27, 2018, now Pat. No. 10,979,390.

(30) Foreign Application Priority Data

Aug. 25, 2017 (JP) .............................. JP2017-162782  
Apr. 17, 2018 (JP) .............................. JP2018-079370

(51) Int. Cl.  
    *H04L 29/06*     (2006.01)  
    *H04L 29/12*     (2006.01)  
    (Continued)

(52) U.S. Cl.  
    CPC .......... *H04L 63/0236* (2013.01); *G06F 21/45* (2013.01); *H04L 61/103* (2013.01);  
    (Continued)

(58) Field of Classification Search  
    CPC ............... H04L 63/0236; H04L 61/103; H04L 63/0209; H04L 63/0263; H04L 63/065;  
    (Continued)

(56) References Cited

U.S. PATENT DOCUMENTS 10,572,495 B2*   2/2020   Raghavan ............... H04L 43/08  
10,581,863 B2*   3/2020   Ernohazy .............. H04W 8/005  
(Continued)

FOREIGN PATENT DOCUMENTS

JP     2006-324723 A     11/2006  
JP     2010-219605 A     9/2010  
(Continued)

OTHER PUBLICATIONS

Extended European Search Report, dated Nov. 20, 2018 by the European Patent Office (EPO), for the related European Patent Application No. 18188650.8.

*Primary Examiner* — Yonas A Bayou  
(74) *Attorney, Agent, or Firm* — Greenblum & Bernstein, P.L.C.

(57) ABSTRACT

A communication security apparatus includes a communicator that receives a packet from a first device and transmits the received packet to a second device, a memory that retains address authentication information containing pairs of a physical address and a logical address of one or more devices, and a controller. After a learning period of receiving and transmitting packets, the controller determines whether a pair of a physical address and a logical address of the first device and the second device match any one of the pairs of the physical address and the logical address of the one or (Continued)

more devices in the packet, and discards the packet when the pair of the physical address and the logical address of the first device and the second device do not match any one of the pairs of the physical address and the logical address of the one or more devices.

8 Claims, 18 Drawing Sheets

(51) Int. Cl.
  *G06F 21/45* (2013.01)
  *H04L 9/40* (2022.01)
  *H04L 61/103* (2022.01)
  *H04L 101/622* (2022.01)
(52) U.S. Cl.
  CPC ...... *H04L 63/0209* (2013.01); *H04L 63/0263* (2013.01); *H04L 63/065* (2013.01); *H04L 63/101* (2013.01); *H04L 63/1425* (2013.01); *H04L 2101/622* (2022.05)
(58) Field of Classification Search
  CPC ............. H04L 63/101; H04L 2101/622; H04L 63/1425; G06F 21/45
  See application file for complete search history.

(56) References Cited

U.S. PATENT DOCUMENTS

| | | | | |
|---|---|---|---|---|
| 2002/0176426 | A1* | 11/2002 | Asano | H04L 63/0209 726/13 |
| 2003/0182580 | A1* | 9/2003 | Lee | H04L 63/0209 726/11 |
| 2005/0091537 | A1* | 4/2005 | Nisbet | H04L 63/20 713/153 |
| 2005/0235352 | A1* | 10/2005 | Staats | H04L 41/0806 726/5 |
| 2006/0026680 | A1* | 2/2006 | Zakas | H04L 63/0236 726/22 |
| 2006/0167871 | A1* | 7/2006 | Sorenson | H04L 63/101 |
| 2008/0168558 | A1* | 7/2008 | Kratzer | H04L 63/1408 726/23 |
| 2009/0080447 | A1 | 3/2009 | Sawada et al. | |
| 2010/0235500 | A1 | 9/2010 | Shizuno | |
| 2011/0191847 | A1* | 8/2011 | Davis | H04L 63/1425 709/224 |
| 2012/0023563 | A1* | 1/2012 | Morgenstern | G06Q 30/02 726/7 |
| 2015/0067764 | A1 | 3/2015 | Kim et al. | |
| 2015/0249666 | A1 | 9/2015 | Kato et al. | |
| 2017/0078884 | A1 | 3/2017 | Tanabe et al. | |
| 2017/0230377 | A1* | 8/2017 | Ernohazy | H04L 63/20 |
| 2017/0237769 | A1* | 8/2017 | Ookawa | H04L 63/126 726/22 |

FOREIGN PATENT DOCUMENTS

| | | |
|---|---|---|
| JP | 2014-183395 A | 9/2014 |
| JP | 2014-232999 A | 12/2014 |
| JP | 2015-165614 A | 9/2015 |
| WO | 2007/108083 A1 | 9/2007 |
| WO | 2015/182103 A1 | 12/2015 |

* cited by examiner

FIG. 4

| PORT ID | MAC ADDRESS | IP ADDRESS |
|---|---|---|
| P1 | 02-02-02-0a-0a-6e | 192.168.0.110 |
| P1 | 02-02-02-0a-0a-6f | 192.168.0.111 |
| P2 | 02-02-02-0a-0a-70 | 192.168.0.112 |
| P3 | 02-02-02-0a-0a-68 | 192.168.0.104 |
| P3 | 02-02-02-0a-0a-71 | 192.168.0.113 |
| P3 | 02-02-02-0a-0a-72 | 192.168.0.114 |
| P3 | 02-02-02-0a-0a-73 | 192.168.0.115 |
| P3 | 02-02-02-0a-0a-74 | 192.168.0.116 |

FIG. 5

| HARDWARE DEVICE ID | PORT ID | METHOD | SEQUENCE ID | MAC ADDRESS | IP ADDRESS |
|---|---|---|---|---|---|
| SH2 | P2 | auto | n/a | 02-02-02-0a-0a-70 | 192.168.0.112 |
| SH2 | P1 | manual | n/a | 02-02-02-0a-0a-6e | 192.168.0.110 |
| SH4 | Q2 | auto | 123555 | 02-02-02-0a-0a-73 | 192.168.0.115 |
| SH4 | Q3 | auto | 123555 | 02-02-02-0a-0a-74 | 192.168.0.116 |

COMMUNICATION SECURITY APPARATUS, CONTROL METHOD, AND STORAGE MEDIUM STORING A PROGRAM

This is a continuation of U.S. patent application Ser. No. 16/047,020, filed Jul. 27, 2018, which claims priority to Japanese Patent Application No. 2017-162782, filed Aug. 25, 2017, and Japanese Patent Application No. 2018-079370, filed Apr. 17, 2018. The disclosure of each of the above-mentioned documents, including the specification, drawings, and claims, is incorporated herein by reference in its entirety.

1. TECHNICAL FIELD

The present disclosure relates to a communication security apparatus, a control method, and a storage medium storing a program.

2. DESCRIPTION OF THE RELATED ART

A communication network deployed in a large factory is typically spread over the factory building with a multitude of hubs connected in multiple tiers. Meanwhile, since production facilities in a factory are in continuous operation, the cessation of operations of the whole system is, for example, avoided as much as possible.

In recent years, attempts have been made to connect manufacturing facilities installed in a factory to the Internet and carry out production management, failure prediction analysis, on-demand production planning, or the like, in the cloud.

In the case where the communication network in a factory is a closed network, which is not connected to the outside, the communication network in the factory may not be maliciously accessed from outside, and therefore the need for security against such malicious access is relatively low. However, if the communication network in a factory is connected to outside, it is difficult to maintain security.

Japanese Unexamined Patent Application Publication No. 2015-165614 discloses a technology for preventing attacks such as eavesdropping or falsification of communication data. In the technology, an administrator sets in advance a trusted physical port (also simply referred to as a port) in a hub to which hardware devices are coupled. This enables the hub to manage communication addresses (also simply referred to as addresses) of a communication packet (also simply referred to as packet) received from the port. Addresses here include an Internet Protocol (IP) address and a media access control (MAC) address. When communication data with a bogus IP address or a bogus MAC address is received from an untrusted port, the hub discards the received communication data, thereby preventing attacks such as eavesdropping or falsification of communication data.

SUMMARY

In one general aspect, the techniques disclosed here feature a communication security apparatus including a communicator that receives a packet from a first device and transmits the received packet to a second device, a memory that retains address authentication information containing pairs of a physical address and a logical address of one or more devices, and a controller that determines whether a pair of a physical address and a logical address of the first device and a pair of a physical address and a logical address of the second device each match any one of the pairs of the physical address and the logical address of the one or more devices when the address authentication information includes a physical address or a logical address of each of the first device and the second device contained in the packet and that discards the packet if it is determined that the pair of the physical address and the logical address of the first device and the pair of the physical address and the logical address of the second device do not match any one of the pairs of the physical address and the logical address of the one or more devices.

The communication security apparatus of the present disclosure may improve security while maintaining some devices constituting an existing communication network.

It should be noted that general or specific embodiments may be implemented as a system, a method, an integrated circuit, a computer program, a storage medium, such as a computer-readable CD-ROM, or any selective combination thereof.

Additional benefits and advantages of the disclosed embodiments will become apparent from the specification and drawings. The benefits and/or advantages may be individually obtained by the various embodiments and features of the specification and drawings, which need not all be provided to obtain one or more of such benefits and/or advantages.

BRIEF DESCRIPTION OF THE DRAWINGS

FIG. 4 is a table showing a structure of a transfer destination table according to the embodiment;

FIG. 5 is a table showing a structure of address authentication information according to the embodiment;

DETAILED DESCRIPTION (Underlying Knowledge Forming Basis of the Present Disclosure)

Known devices installed in factories or the like are operated while connected to each other through their own communication lines and communicating with each other with own communication system. With the spread of the Internet, devices using Ethernet (registered trademark) or IP, which are general protocols with improved high-speed and low-cost features, have been installed in factories.

However, in Ethernet and IP, security is not fully considered.

Figure 1:
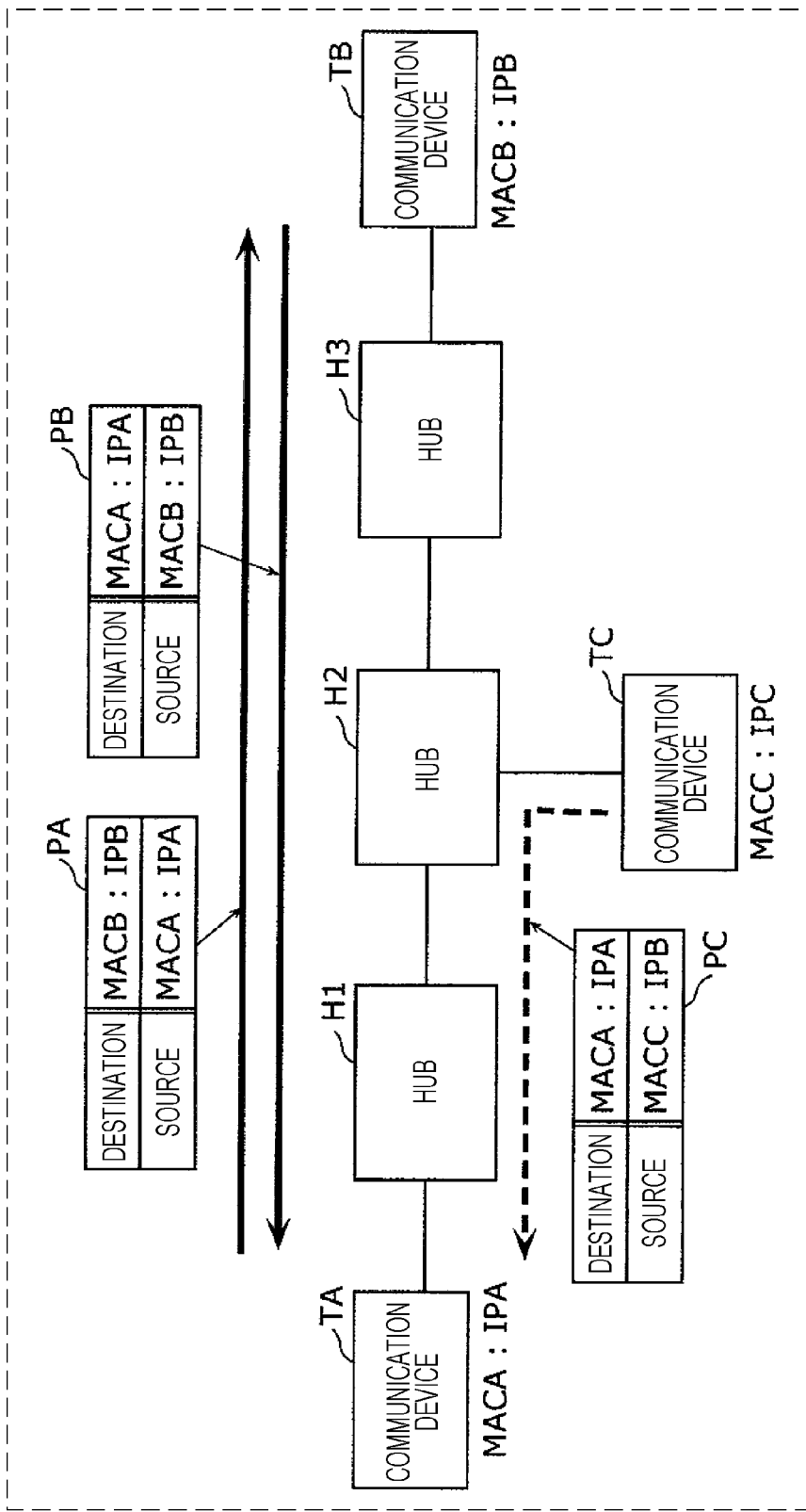
FIG. 1 is a block diagram illustrating a configuration of a communication system according to an embodiment and addresses in a packet.

For example, it is assumed that a communication device TA and a communication device TB communicate with each other via hubs H1, H2, and H3 of a communication network illustrated in FIG. 1. A packet PA is transmitted from the communication device TA to the communication device TB, and a packet PB is transmitted from the communication device TB to the communication device TA. The communication performed with the packets PA and PB is legitimate.

In this communication network, illegitimate communication may be performed such that a communication device TC transmits to the communication device TA a packet PC in which the source IP address is spoofed as the address of the communication device TB (that is, IPB). This may cause a problem in which the communication device TC carries out an attack such as transmitting a large number of the packets PC to the communication device TA, resulting in an increased processing load on the communication device TA or causing a malfunction of the communication device TA.

Additionally, there is another problem in which attacks such as a man-in-the-middle (MITM) attack, where the communication device TC logically alters the communication path by exploiting the Address Resolution Protocol (ARP) and a third party who is not an authorized communicator performs eavesdropping or falsification of data, may be carried out relatively easily.

The technology disclosed in Japanese Unexamined Patent Application Publication No. 2015-165614 is capable of discarding spoofed communication with a device coupled to a trusted port of a hub with a security function. To secure communication with a device that is not coupled directly to the trusted port of the hub with a security function and that is present at a distant location, multiple hubs with a security function need to be connected in multiple tiers, and in the multiple hubs with a security function all ports through which the communication to be secured is performed needs to be set as trusted ports.

However, since factories may be large, devices that perform communication to be protected are usually installed apart from each other. In addition, the number of devices installed in a factory may be substantial. Hence, it is not realistic to replace all the hubs exiting between the devices that perform communication to be protected with hubs having a security function.

The present disclosure provides a communication security apparatus that improves security while maintaining some devices constituting an existing communication network.

A communication security apparatus according to an aspect of the present disclosure includes a communicator that receives a packet from a first device and transmits the received packet to a second device, a memory that retains address authentication information containing pairs of a physical address and a logical address of one or more devices, and a controller that determines whether a pair of a physical address and a logical address of the first device and a pair of a physical address and a logical address of the second device each match any one of the pairs of a physical address and a logical address of the one or more devices when the address authentication information includes a physical address or a logical address of each of the first device and the second device contained in the packet and that discards the packet in a case where it is determined that the pair of the physical address and the logical address of the first device and the pair of the physical address and the logical address of the second device do not match any one of the pairs of the physical address and the logical address of the one or more devices.

With this configuration, by directly connecting the communication security apparatus to a device to be protected, falsification, leakage, or blocking of communication data between devices caused by third party's acquisition of communication data may be prevented. Furthermore, since a general hub is useable for connection between the communication security apparatuses, the existing facilities remain to be used. In such a manner, the communication security apparatus may improve security while maintaining part of devices constituting an existing communication network.

For example, the memory may further retain a group key shared with another communication security apparatus different from the communication security apparatus. The controller may receive via the communicator an update notification message containing addresses of a third device and message authentication information from the other communication security apparatus. In a case where authentication information generated by a given algorithm by using the group key matches the message authentication information, the controller may update the address authentication information by adding the addresses of the third device contained in the update notification message to the address authentication information.

With this configuration, the verification of the validity of the communication message are accomplished between only the communication security apparatuses in the same group to which the same secret key is set, and the communication message can be transmitted to only the communication security apparatus belonging to the same group. In such a manner, the communication security apparatus may avoid operating in response to, for example, receiving an illegitimate update notification message sent by a malicious person. Hence, the communication security apparatus may avoid operating in accordance with an illegitimate update notification message, thereby improving security while maintaining part of devices constituting an existing communication network.

For example, the controller may transmit via the communicator the address authentication information to another communication security apparatus different from the communication security apparatus.

With this configuration, the communication security apparatus can share the address authentication information with the other communication security apparatus. In such a manner, the communication security apparatus may, in cooperation with the other communication security apparatus, improve security while maintaining part of devices constituting an existing communication network.

For example, the address authentication information may contain pairs of addresses of the one or more devices and sequence IDs respectively associated with the pairs. The controller may include in the address authentication information the sequence ID that is incremented every time the address authentication information is transmitted to the other communication security apparatus via the communicator.

With this configuration, the communication security apparatus can share the address authentication information with the other communication security apparatus in accordance with the sequence ID. More specifically, it is effective in defending against a save and replay attack that overwrites past information by capturing the address authentication information on a communication path and reseeding the captured update notification message.

For example, the controller may collect addresses of a device communicable with the communicator and update the address authentication information in accordance with the collected addresses.

With this configuration, the communication security apparatus can update the address authentication information by collecting the addresses of the communicable device. As a result, it is advantageous that an administrator of the communication security apparatus does not need to search addresses of a communicable device and set the addresses in the communication security apparatus. Moreover, it is also advantageous that, since the communication security apparatus can update the address authentication information in response to a communication packet coming into the communication security apparatus, the administrator does not need to repeatedly search and update the address authentication information.

For example, the address authentication information may contain a pair of a media access control (MAC) address and an Internet Protocol (IP) address. In a case where, when the address authentication information is updated, a specific IP address is associated with only one pair of the collected addresses including the MAC address, the controller may update the address authentication information by adding the one pair to the address authentication information.

With this configuration, in a case where there is only one pair of the collected addresses the MAC address of which is associated with a specific IP address, the pair may be added to the address authentication information as a pair of a trusted IP address and a trusted MAC address.

A control method according to another aspect of the present disclosure is for a communication security apparatus including a memory that retains address authentication information containing addresses of one or more devices. The control method includes performing communication for receiving a packet from a first device and transmitting the received packet to a second device, and performing control for determining whether addresses of the second device contained in the packet are included in the address authentication information and for discarding the packet in a case where it is determined that the addresses of the second device are not included in the address authentication information.

As a result, the control method has the same advantages as those of the above-described communication security apparatus.

A storage medium according to a further aspect of the present disclosure is a non-transitory storage medium storing a program that realizes the above-described method. The program causes a computer to execute the above-described control method.

As a result, the storage medium has the same advantages as those of the above-described communication security apparatus.

It should be noted that general or specific embodiments may be implemented as a system, a method, an integrated circuit, a computer program, a storage medium, such as a computer-readable CD-ROM, or any selective combination thereof.

Any of the embodiments described below represents a specific example of the present disclosure. The numerical values, shapes, components, steps, the order of steps, and the like explained in the following embodiments are mere examples and are not intended to limit the present disclosure. Furthermore, among the components in the following embodiment, components not recited in any of the independent claims indicating the most generic concept of the present disclosure are described as preferable components. In addition, the contents may be mutually combined in all embodiments.

Embodiment

An embodiment is described with reference to the accompanying drawings. It should be noted that like reference symbols are used to denote like components in the respective drawings.

1. Overall Configuration of Communication System

Figure 2:
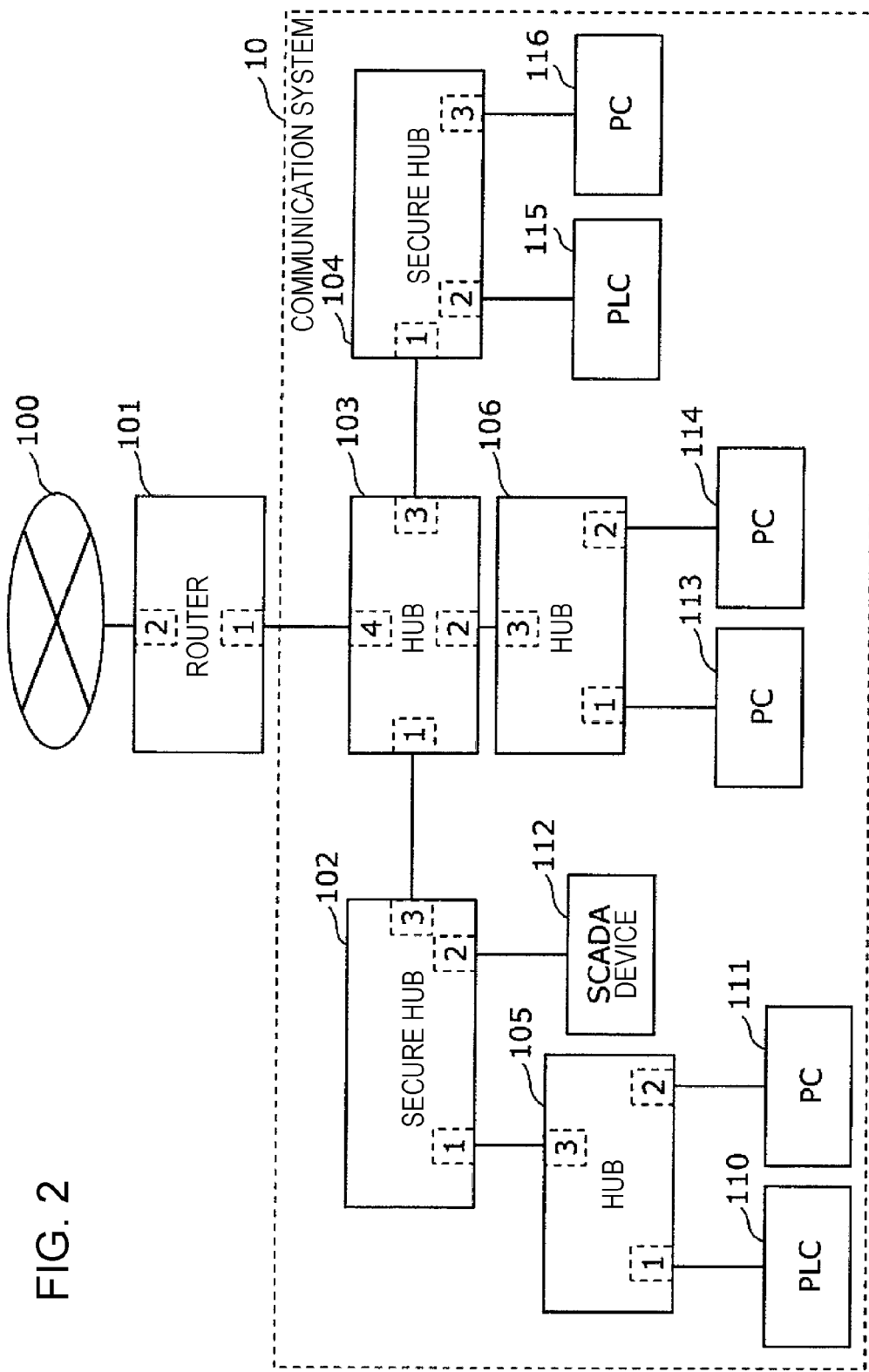
FIG. 2 is a block diagram illustrating a configuration of the communication system according to the embodiment.

FIG. 2 is a block diagram illustrating a configuration of a communication system 10 of the embodiment. The communication system 10 includes a communication network deployed, for example, in a factory and hardware devices connected to the communication network. It should be noted that the communication system 10 is not limited to the communication system deployed in a factory.

In the embodiment, the hardware devices in a factory perform communication by using an appropriate protocol, such as Transmission Control Protocol (TCP)/IP or User Datagram Protocol (UDP)/IP, in accordance with the characteristics of an application over Ethernet defined by IEEE 802.3.

In FIG. 2, the communication system 10 is connected via a router 101 to an internet line 100. This enables advanced control such as remotely monitoring a hardware device via the internet line 100.

The hardware devices communicate with each other by being connected to hubs 103, 105, or 106, or secure hubs 102 or 104, which are a form of a communication security apparatus.

The hubs 103, 105, and 106, and the secure hubs 102 and 104 each have a function of routing a packet transmitted from a hardware device to an appropriate hardware device in accordance with the address information in the packet.

In FIG. 2, the communication system 10 includes, as the hardware devices connected to the communication network, programmable logic controllers (PLC) 110 and 115, a Supervisory Control And Data Acquisition (SCADA) device 112, and personal computers (PC) 111, 113, 114, and 116.

The PLCs 110 and 115 control, for example, a motor for a belt conveyor and the like on a production line or a sensor for positioning braking equipment. The SCADA device 112 performs system monitoring or control monitoring of the PLCs or the like, more specifically, process monitoring. The PC 111, 113, 114, and 116 are PCs for production that perform guidance for following production procedures and that collect traceability data.

In FIG. 2, the lines between components represent LAN cables. Each of the numerals at the points where the hubs 103, 105, and 106 and the secure hubs 102 and 104 are connected to the LAN cables represents an identifier of a physical port (also simply referred to as a port) to which a LAN cable is connected.

The communication system 10 illustrated in FIG. 2 may, by using the secure hubs 102 and 104, hinder an attack attempting to cause an increased load on or malfunction of, for example, the PLC 115, where the PC 114 masquerades as the SCADA device 112 and transmits a packet to the PLC 115. Configurations and processing operations for hindering the aforementioned attack will be described below.

2. Configuration of Secure Hub

Figure 3:
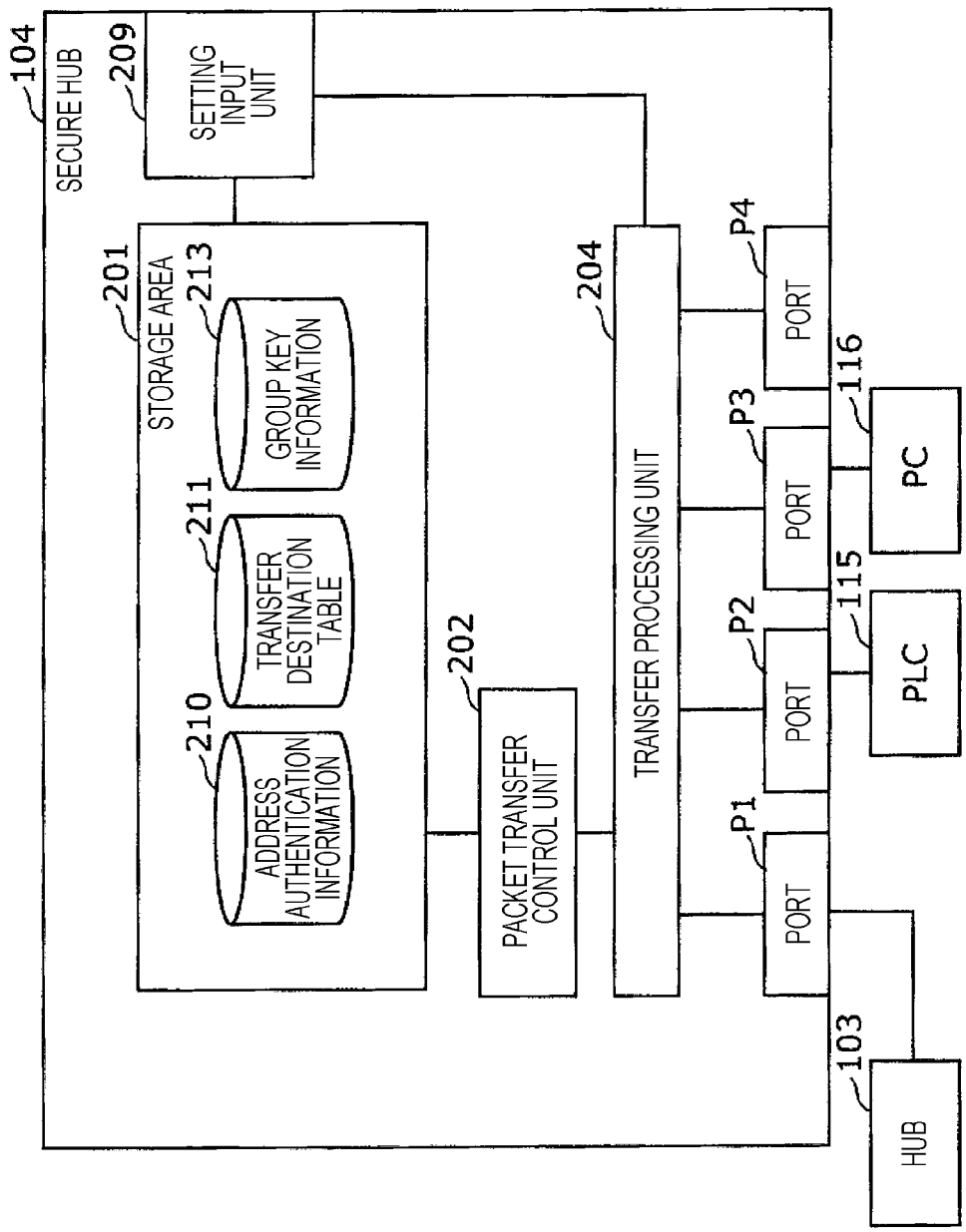
FIG. 3 is a block diagram illustrating a configuration of a secure hub according to the embodiment.

FIG. 3 is a block diagram illustrating a configuration of the secure hub 104. The description here uses the secure hub 104 as an example, but the description is also applicable to the secure hub 102. In FIG. 3, the secure hub 104 includes a storage area 201, a packet transfer control unit 202, a transfer processing unit 204, ports P1, P2, P3, and P4, and a setting input unit 209. The ports P1, P2, P3, and P4 are also simply referred to as ports.

The packet transfer control unit 202 determines whether a packet can be transferred.

In addition, the packet transfer control unit 202 transmits address authentication information 210 via the port to the other secure hub. The packet transfer control unit 202 also receives from another secure hub an update notification message containing addresses and message authentication information. In a case where authentication information generated by a given algorithm by using a group key matches the message authentication information, the packet transfer control unit 202 updates the address authentication information 210 by adding the addresses contained in the update notification message to the address authentication information 210.

Additionally, the packet transfer control unit 202 collects the addresses of a hardware device communicable with the port and updates the address authentication information 210 in accordance with the collected addresses.

The transfer processing unit 204 performs input/output (I/O) processing in which the port receives or transmits a packet. In a case where the addresses (more specifically, physical addresses or logical addresses of both a source hardware device and a destination hardware device) contained in the packet received by the port are contained in the address authentication information 210, the transfer processing unit 204 determines whether the pair of the physical address and the logical address of the source hardware device and the pair of the physical address and the logical address of the destination hardware device each match any pair of a physical address and a logical address contained in the address authentication information 210. If the transfer processing unit 204 determines that there is no identical pair, the packet is discarded.

The packet transfer control unit 202 and the transfer processing unit 204 correspond to a controller.

Each of the ports P1, P2, P3, and P4 is a physical port connected to one of the hardware devices. The ports P1, P2, P3, and P4 each receive a packet from the connected hardware device and transmit the received packet to another hardware device connected to another port in accordance with the address information contained in the packet. A port ID as an identifier is assigned to each of the ports P1, P2, P3, and P4. The port ID corresponds to a physical port number of a communication device, such as a general hub. It is assumed that the port ID of the port P1 is "P1", which is the same as its reference numeral. In FIG. 2, the port ID of the port P1 is simply presented as "1". The same holds for other ports.

For example, the hub 103 is connected to the port P1, the PLC 115 to the port P2, and the PC 116 to the port P3. The ports P1, P2, P3, and P4 correspond to a communicator.

The setting input unit 209 provides an input I/F for setting information entered by a user.

The setting input unit 209 provides, for example, a graphical web-based interface (not shown) for setting performed by a user. The setting input unit 209 provides, for example, a web-based interface for a user to set the IP addresses of the secure hubs 102 and 104 installed in the communication system 10 and a group key used for authentication between the secure hubs 102 and 104. The setting input unit 209 may provide, for example, a web-based interface for manually setting a pair of a trusted IP address and a trusted MAC address as the address authentication information 210 as needed.

The storage area 201 is a storage device for retaining various kinds of information. The storage area 201 corresponds to a memory.

The information stored in the storage area 201 contains the address authentication information 210, a transfer destination table 211, and group key information 213.

The address authentication information 210 is information that records the correspondence between a trusted IP address and a trusted MAC address. The address authentication information 210 contains addresses of at least one hardware device.

The transfer destination table 211 contains information for managing MAC addresses of hardware devices connected to the ports P1, P2, P3, and P4.

The group key information 213 is key information used as authentication information between the secure hubs 102 and 104.

It is assumed that the ports of the secure hub 102 are represented as ports Q1, Q2, Q3, and Q4. It is also assumed that the port ID of the port Q1 is "Q1", which is the same as its reference numeral. In FIG. 2, the port ID of the port Q1 is simply presented as "1". The same holds for other ports. For example, the SCADA device 112 is connected to the port Q2 of the secure hub 102.

3. Structure of Storage Area

The information retained in the storage area 201 will be described in detail below.

FIG. 4 is a table showing a structure of the transfer destination table 211. The transfer destination table 211 contains information for managing MAC addresses of hardware devices connected to ports of a secure hub and is used when a destination port for a packet is determined.

The transfer destination table 211 includes a port ID 401, which is an identifier of a port of a secure hub, a MAC address 402 of a network interface card of a hardware device connected to the port, and an IP address 403 of the hardware device.

The MAC address 402 and the IP address 403 are of a hardware device connected directly to the port or connected indirectly to the port via a hub. In the case of connecting a hardware device via a hub, pairs of a MAC address and an IP address of multiple hardware devices may be registered for a single port.

In FIG. 4, for example, two pairs of a MAC address and an IP address are registered for the port P1. More specifically, the two pairs, that is, the pair of the MAC address "02-02-02-0a-0a-6e" and the IP address "192.168.0.110" and the pair of the MAC address "02-02-02-0a-0a-6f" and the IP address "192.168.0.111" are registered for the port P1.

In a case where multiple IP addresses are assigned to a network interface card of a hardware device, the multiple IP addresses may be registered for a single MAC address.

The MAC address 402 may be obtained from a source MAC address in an Ethernet (registered trademark) frame transmitted from a hardware device connected to a port. The IP address 403 may be obtained from a source IP address stored in an ARP packet transmitted from a hardware device connected to a port. The ARP packet will be described later, FIG. 5 is a table showing a structure of the address authentication information 210. The address authentication information 210 contains a hardware device ID 501, a port ID 502, a method 503, a sequence ID 504, a MAC address 505, and an IP address 506.

The hardware device ID 501 is an identifier for identifying a secure hub. It is assumed here that the hardware device ID of the secure hub 104 is SH4 and that the hardware device ID of the secure hub 102 is SH2.

The port ID 502 is an identifier for identifying a port of a secure hub.

The hardware device ID 501 and the port ID 502 enable a secure hub and a port to which a trusted hardware device among hardware devices connected to secure hubs included in the communication system 10 is connected to be specified.

The method 503 is a learning method for obtaining a trusted MAC address and a trusted IP address. The learning method is selected from "auto" or "manual". The term "auto" means that the trusted MAC address and the trusted IP address are obtained by dynamic learning performed by a secure hub. The term "manual" means that the trusted MAC address and the trusted IP address are obtained in accordance with a manual setting for the secure hub performed by an administrator.

The sequence ID 504 is a sequence ID when the address authentication information 210 is shared between the secure hubs.

The MAC address 505 and the IP address 506 are of a hardware device that is connected to a secure hub and that is determined to be trusted.

The address authentication information 210 is used to manage both the above-described kinds of information generated by the secure hub 104 that has the address authentication information 210 and the above-described kinds of information reported by the secure hub 102 as another secure hub. The processing for generating the address authentication information 210 and the processing for sharing the address authentication information 210 between secure hubs will be described later.

4. Structure of ARP Packet

Next, the structure of the ARP packet will be described. ARP is a protocol for searching for a MAC address that is a physical address of a communication partner in order to transmit an Ethernet (registered trademark) frame to the communication partner when the IP address of the communication partner is known. The ARP packet is included in the payload of an Ethernet (registered trademark) frame.

Figure 6:
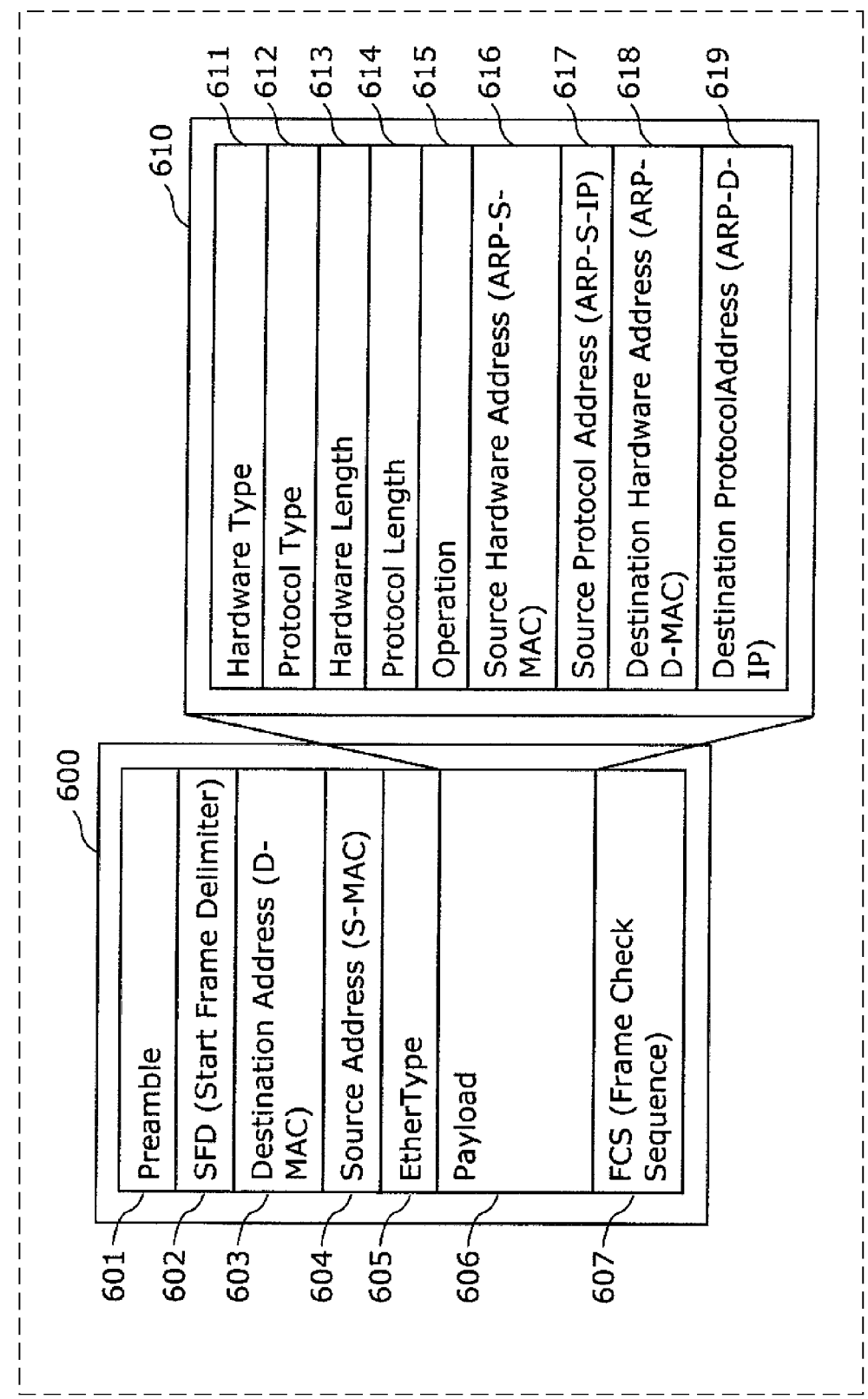
FIG. 6 is an illustration showing a structure of an Ethernet (registered trademark) frame according to the embodiment.

FIG. 6 is an illustration showing a structure of an Ethernet (registered trademark) frame 600. The Ethernet (registered trademark) frame 600 illustrated in FIG. 6 has a format defined by IEEE 802.3. More specifically, the Ethernet (registered trademark) frame 600 contains Preamble 601, which indicates the start of data, Start Frame Delimiter (SFD) 602, D-MAC 603, which is a destination physical address, S-MAC 604, which is a source physical address, EtherType 605, which is the type of transmission data, Payload 606, which is transmission data, and Frame Check Sequence (FCS) 607, which is used for checking errors of transmission data.

Payload 606 contains an ARP packet 610.

The ARP packet 610 has a format defined by RFC 826. The ARP packet 610 contains Hardware Type 611, Protocol Type 612, Hardware Length 613, Protocol Length 614, Operation 615, ARP-S-MAC 616, ARP-S-IP 617, ARP-D-MAC 618, and ARP-D-IP 619. Hardware Type 611 indicates the type of a protocol used in the data link layer of the Open Systems Interconnection (OSI) model. Protocol Type 612 indicates the type of a protocol used in the network layer of the OSI model. Hardware Length 613 indicates the length of an address at the data link layer, or a MAC address. Protocol Length 614 indicates the length of an address at the network layer, or an IP address. Operation 615 stores an operation code indicating an operation type for distinguishing request or reply. ARP-S-MAC 616 is the address at the data link layer of the source of the ARP packet. ARP-S-IP 617 is the address of the source at the network layer. ARP-D-MAC 618 is the address at the data link layer of the hardware device as a target for obtaining an address. ARP-D-IP 619 is the address at the network layer of the hardware device as a target for obtaining an address.

Next, the structure of an ARP request packet representing a request for a MAC address and the structure of an ARP reply packet representing a reply to a request will be described.

Figure 7:
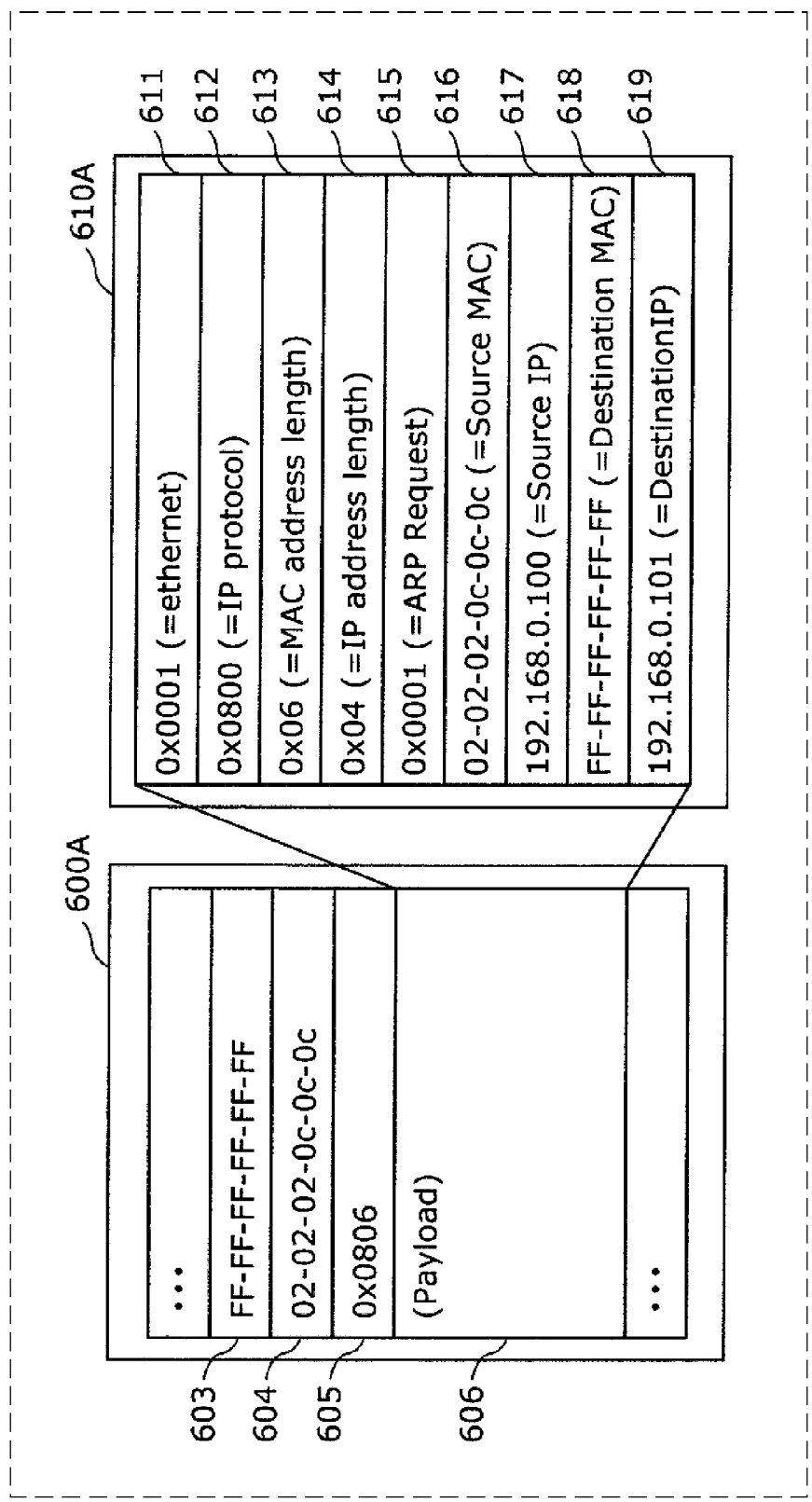
FIG. 7 is an illustration showing an example of an ARP request packet according to the embodiment.
Figure 8:
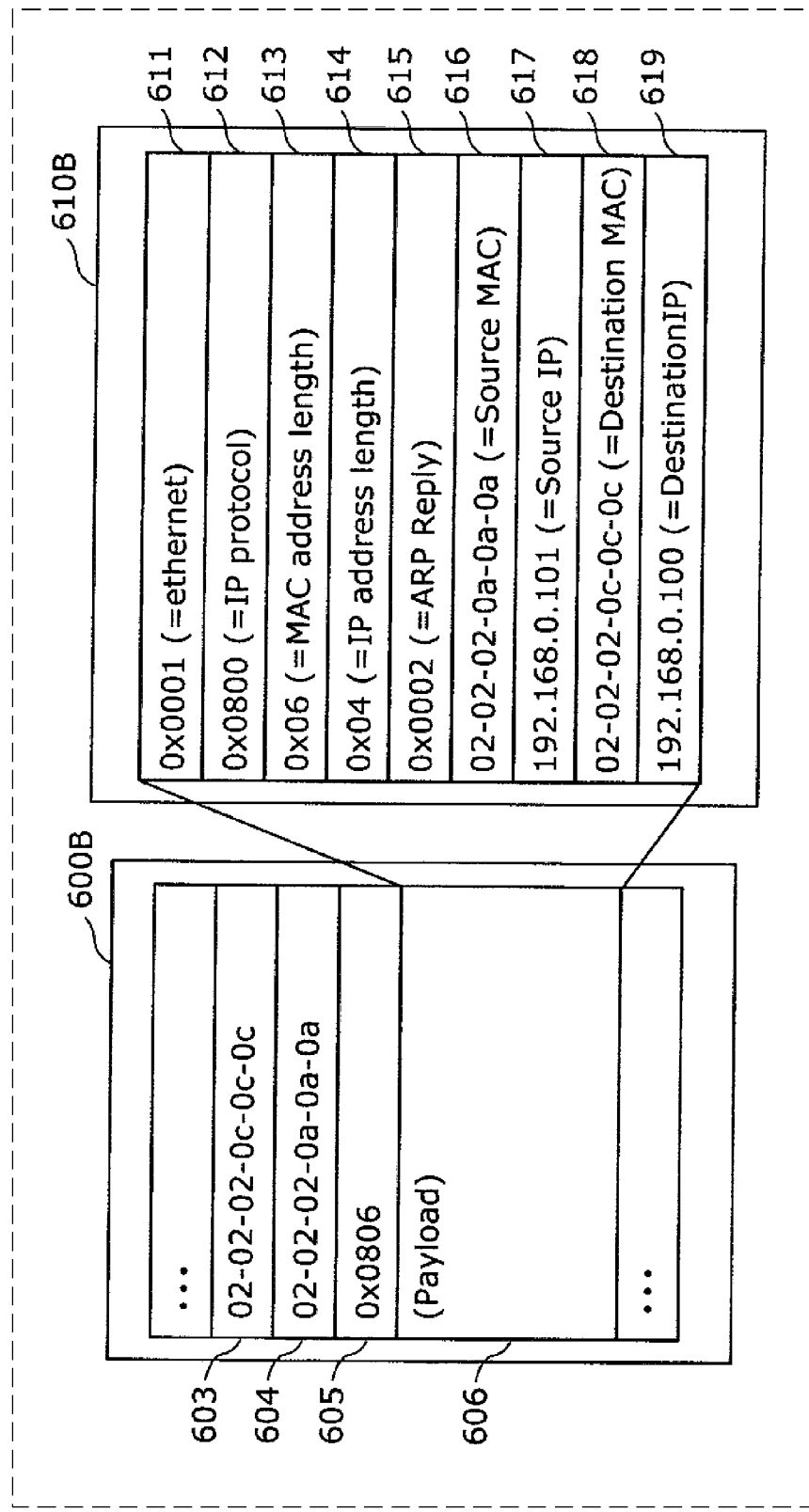
FIG. 8 is an illustration showing an example of an ARP reply packet according to the embodiment.

FIG. 7 is an illustration showing an example of the ARP request packet. FIG. 8 is an illustration showing an example of the ARP reply packet. The ARP request packet and the ARP reply packet are obtained by setting specific information in the fields of the ARP packet illustrated in FIG. 6.

It is assumed here that the MAC address of the source hardware device of the ARP request packet is "02-02-02-0c-0c-0c" and that the IP address of the source hardware device is "192.168.0.100". The source hardware device transmits the ARP request packet for obtaining the MAC address of the hardware device having the IP address of "192.168.0.101". In response to the transmitted ARP request packet, the hardware device having the IP address of "192.168.0.101" reports the MAC address "02-02-02-0a-0a-0a". The structure of the Ethernet (registered trademark) frame in the above-described case will be described.

It should be noted that only the fields relating to the ARP packet 610 in the Ethernet (registered trademark) frame 600 illustrated in FIG. 6 are illustrated in FIG. 7, and Preamble 601, SFD 602, and FCS 607 are omitted.

An ARP request packet 610A illustrated in FIG. 7 is used for searching for a MAC address of a hardware device of a given IP address and broadcast all hardware devices connected to the communication system 10.

The ARP request packet 610A is contained in an Ethernet (registered trademark) frame 600A.

In the Ethernet (registered trademark) frame 600A, "FF-FF-FF-FF-FF-FF", which indicates broadcast, is stored in D-MAC 603, and "02-02-02-0c-0c-0c", which is the MAC address of the network interface card of the source, is stored in S-MAC 604. EtherType 605 stores "0x0806", which indicates that the data type of Payload 606 is an ARP packet.

The ARP request packet 610A stores the values described below. Hardware Type 611 stores "0x0001", which indicates the protocol type is Ethernet (registered trademark). Protocol Type 612 stores "0x0800", which indicates the protocol type is the IP protocol. Hardware Length 613 stores "0x06", which indicates that the length of the MAC address is 6 bytes. Protocol Length 614 stores "0x04", which indicates that the length of the IPv4 address is 4 bytes. Operation 615 stores "0x0001", which indicates that the operation of the ARP is request. ARP-S-MAC 616 stores the source MAC address of "02-02-02-0c-0c-0c". ARP-S-IP 617 stores the source IP address of "192.168.0.100". ARP-D-MAC 618 stores a dummy value of "FF-FF-FF-FF-FF-FF". ARP-D-IP 619 stores "192.168.0.101", which indicates the IP address of the investigation target.

The hardware device having received the ARP request packet 610A checks ARP-DIP 619 of the packet and determines whether the IP address in ARP-D-IP 619 is identical to its own IP address. When it is determined that the IP address is identical, the hardware device returns the ARP reply packet 610B described below. In a case where it is determined that the IP address is not identical, the ARP request packet is discarded.

FIG. 8 is an illustration showing the ARP reply packet 610B. FIG. 8 shows only the fields relating to the ARP packet 610 in the Ethernet (registered trademark) frame 600 illustrated in FIG. 6 and omits Preamble 601, SFD 602, and FCS 607.

The ARP reply packet 610B is a packet that is returned by the hardware device having the IP address of the investigation target in response to receiving the ARP request packet 610A. The ARP reply packet 610B is also used for the purpose of notifying other hardware devices of the change of the IP address of a hardware device, which is referred to as gratuitous ARP.

In terms of the ARP reply packet 610B, the description of the fields having the same values as those of the ARP request packet 610A illustrated in FIG. 7 is omitted. The hardware device having received the ARP request packet 610A generates the ARP reply packet 610B containing its own IP address and own MAC address and transmits the ARP reply packet 610B to the source hardware device of the ARP request packet 610A.

D-MAC 603 of the Ethernet (registered trademark) frame 600B stores "02-02-02-0c-0c-0c", which is the MAC address of the hardware device having transmitted the request packet. S-MAC 604 stores the source MAC address of "02-02-02-0a-0a-0a".

The ARP reply packet 610B stores the values described below are stored. In Operation 615, "0x0002", which indicates that the operation of ARP is reply. ARP-S-MAC 616 stores the source MAC address of "02-02-02-0a-0a-0a". ARP-S-IP 617 stores the source IP address of "192.168.0.101". ARP-D-MAC 618 stores the destination MAC address of "02-02-02-0c-0c-0c". ARP-D-IP 619 stores the destination IP address of "192.168.0.100".

As described above, the hardware device that has transmitted the ARP request packet 610A obtains the MAC address corresponding to the IP address of the hardware device of the investigation target by receiving the ARP reply packet 610B from the hardware device of the investigation target.

5. Structure of Message for Reporting Address Authentication Information

Figure 9:
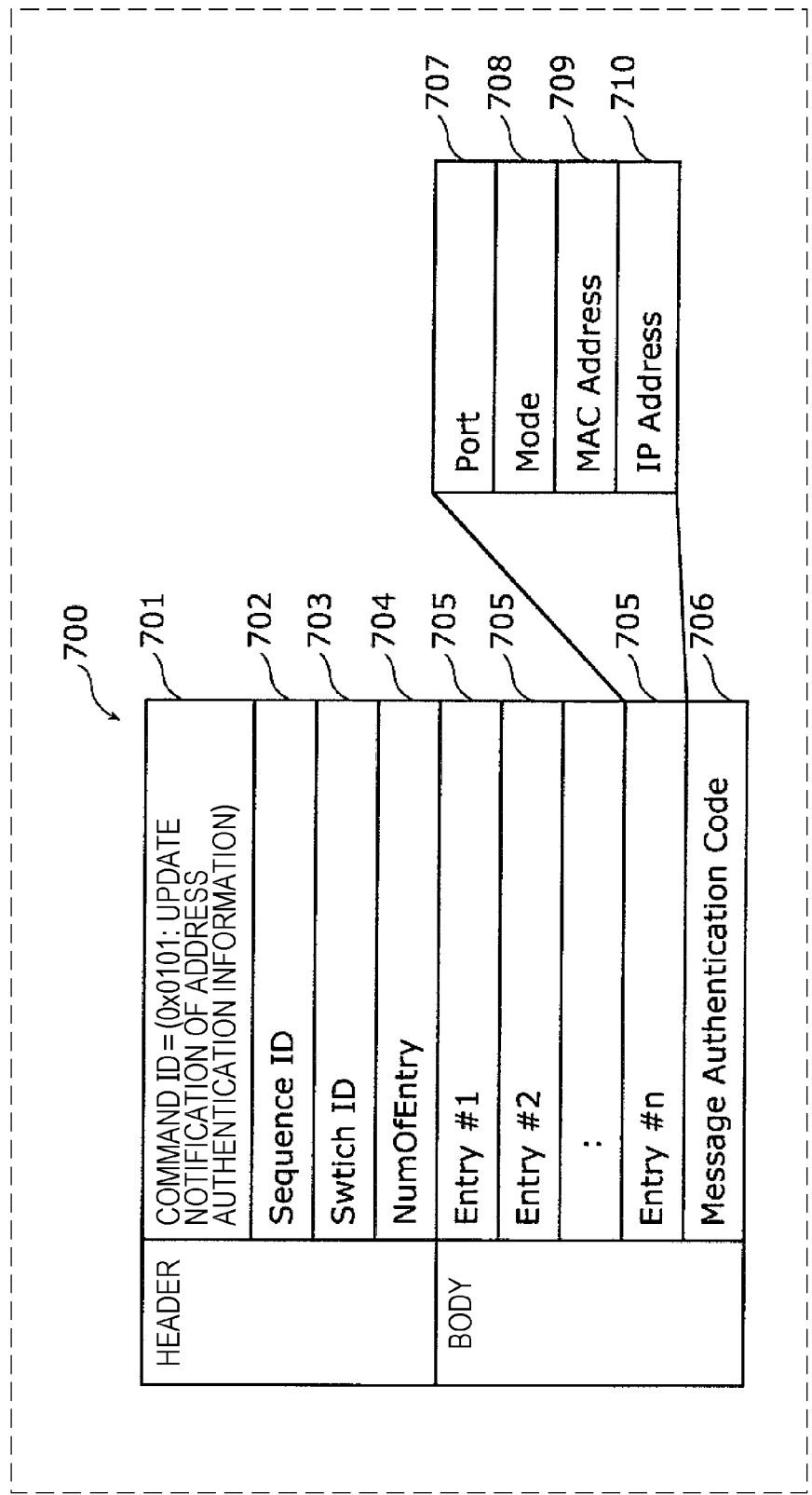
FIG. 9 is an illustration showing a structure of an update notification message for reporting the address authentication information according to the embodiment.

Next, a message used in the case of reporting the address authentication information 210 among multiple secure hubs will be described. The communication message is broadcast from a secure hub to hardware devices existing in the communication system 10. Only secure hubs in the same group as the secure hub having transmitted the communication message are capable of receiving the transmitted communication message, FIG. 9 is an illustration for describing a structure of an update notification message 700 with which a secure hub reports the address authentication information 210. The message illustrated in FIG. 9 is the update notification message 700 used by a secure hub for updating the address authentication information 210 that is owned by another secure hub. The update notification message 700 is contained in Payload 606 of the Ethernet (registered trademark) frame 600 or in the payload of an IP packet.

As illustrated in FIG. 9, the update notification message 700 has a header portion and a body portion.

The header portion contains Command ID 701, Sequence ID 702, Switch ID 703, and NumOfEntry 704.

Command ID 701 is the field where the command type is stored. The command type is, for example, "04101: update notification of address authentication information".

Sequence ID 702 is the field that stores a distinctive number for an update notification message to enable detection of a duplicate update notification message. A count value that is possessed by the secure hub transmitting the update notification message and that regularly increases is set in Sequence ID 702. Every time the secure hub transmits a communication message, the count value is incremented; in other words, 1 is added to the count value. Sequence ID 702 is effective in defending against a save and replay attack, which overwrites past information by capturing the update notification message and resending the captured update notification message.

Switch ID 703 is the field which stores the hardware device ID of the secure hub having transmitted the update notification message.

NumOfEntry 704 is the field which stores the number of pieces of address authentication information contained in the body portion of the update notification message.

The body portion contains the number n of Entry 705 that stores the address authentication information, and Message Authentication Code 706. Here, n is the number that is stored in NumOfEntry 704. Message Authentication Code 706 stores authentication information for data containing the header portion and the number n of Entry 705 contained in the body portion.

Message Authentication Code 706 stores the authentication information of the update notification message. Message Authentication Code 706 is, for example, the authentication information generated by a hash-based message authentication code (HMAC) algorithm defined by RFC 2104. The secure hub employs the key information stored in the group key information 213 as the secret key of the HMAC algorithm. The secure hub can accomplish the verification of the validity of a communication message with only the secure hub having the same secret key; in other words, belonging to the same group. In such a manner, the secure hub can transmit a communication message to only the secure hub belonging to the same group.

Entry 705 stores the address authentication information 210 generated by the secure hub. The address authentication information 210 generated by the secure hub itself is the address authentication information 210 illustrated in FIG. 5 having the hardware device ID 501 identical to its own hardware device ID. The port ID 502 of the address authentication information 210 is stored in Port 707, the method 503 of the address authentication information 210 is stored in Mode 708, the MAC address 505 of the address authentication information 210 is stored in MAC Address 709, and the IP address 506 of the address authentication information 210 is stored in IP Address 710, so as to generate Entry 705.

6. Structure of IP Header

Figure 10:
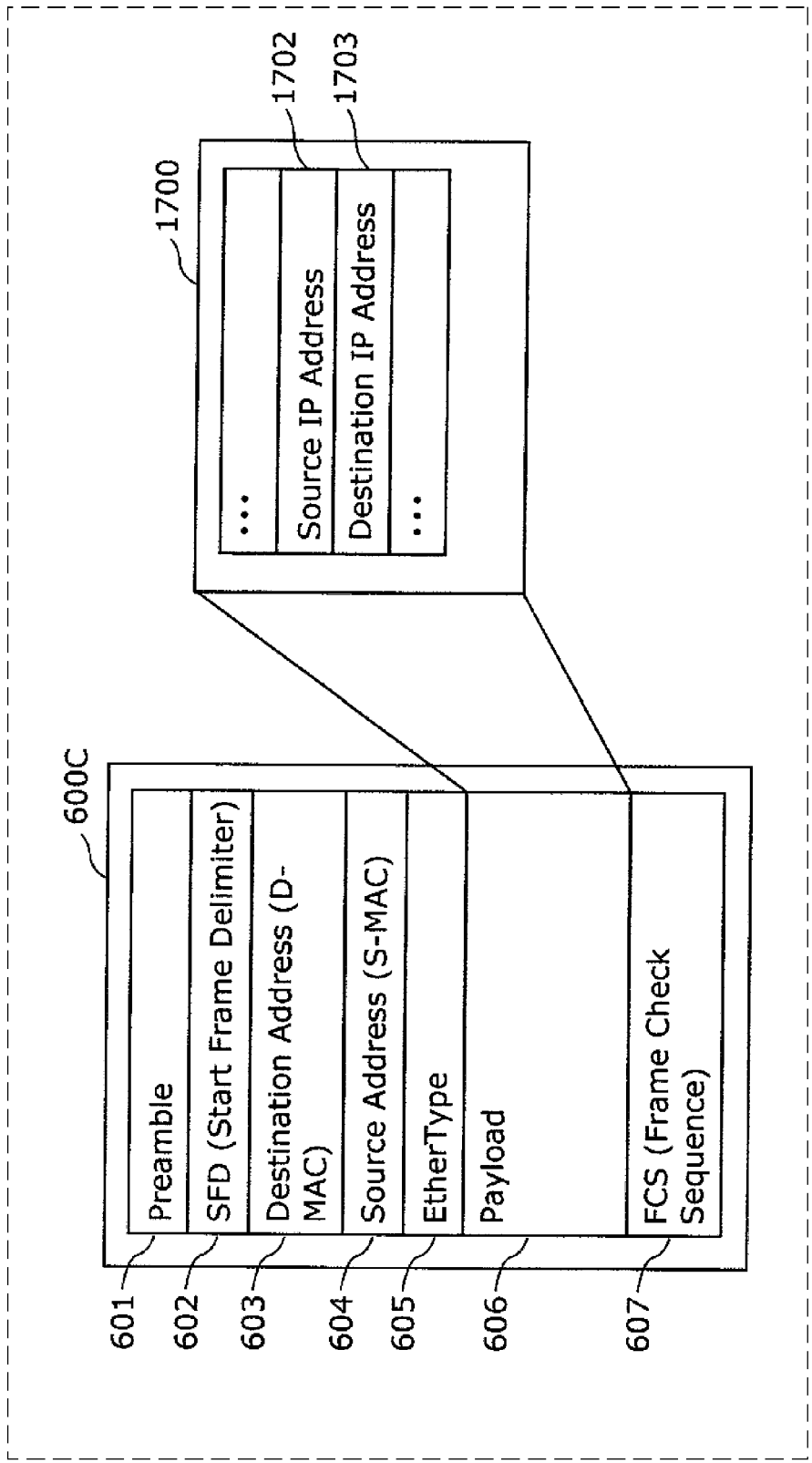
FIG. 10 is an illustration showing an example of a structure of an IP header according to an embodiment.

Next, the details of an IP header will be described. FIG. 10 is an illustration showing an Ethernet (registered trademark) frame 600C containing an IP packet used when hardware devices on a network perform IP communication defined by RFC 791 with each other.

As illustrated in FIG. 10, an IP header 1700 is stored in Payload 606 of the Ethernet (registered trademark) frame 600C and used for identifying a destination address. The IP header 1700 contains Source IP Address 1702 and Destination IP Address 1703, which are used for identifying a destination IP address and a source IP address.

7. Operation of Secure Hub

Next, the operation of the secure hub will be described. In this embodiment, the description of the operation of the secure hub is divided into the processing for registering the address authentication information 210 after learning of the transfer status of a packet is completed and the processing for transferring a packet by using the registered address authentication information 210. It should be noted that it is not essential that each of the two kinds of processing be performed separately as the operation of the secure hub. In other words, as the operation of the secure hub, while the processing for transferring a packet is performed, the processing for registering the address authentication information 210 may be performed.

7-1. Registration Processing of Address Authentication Information

Figure 11:
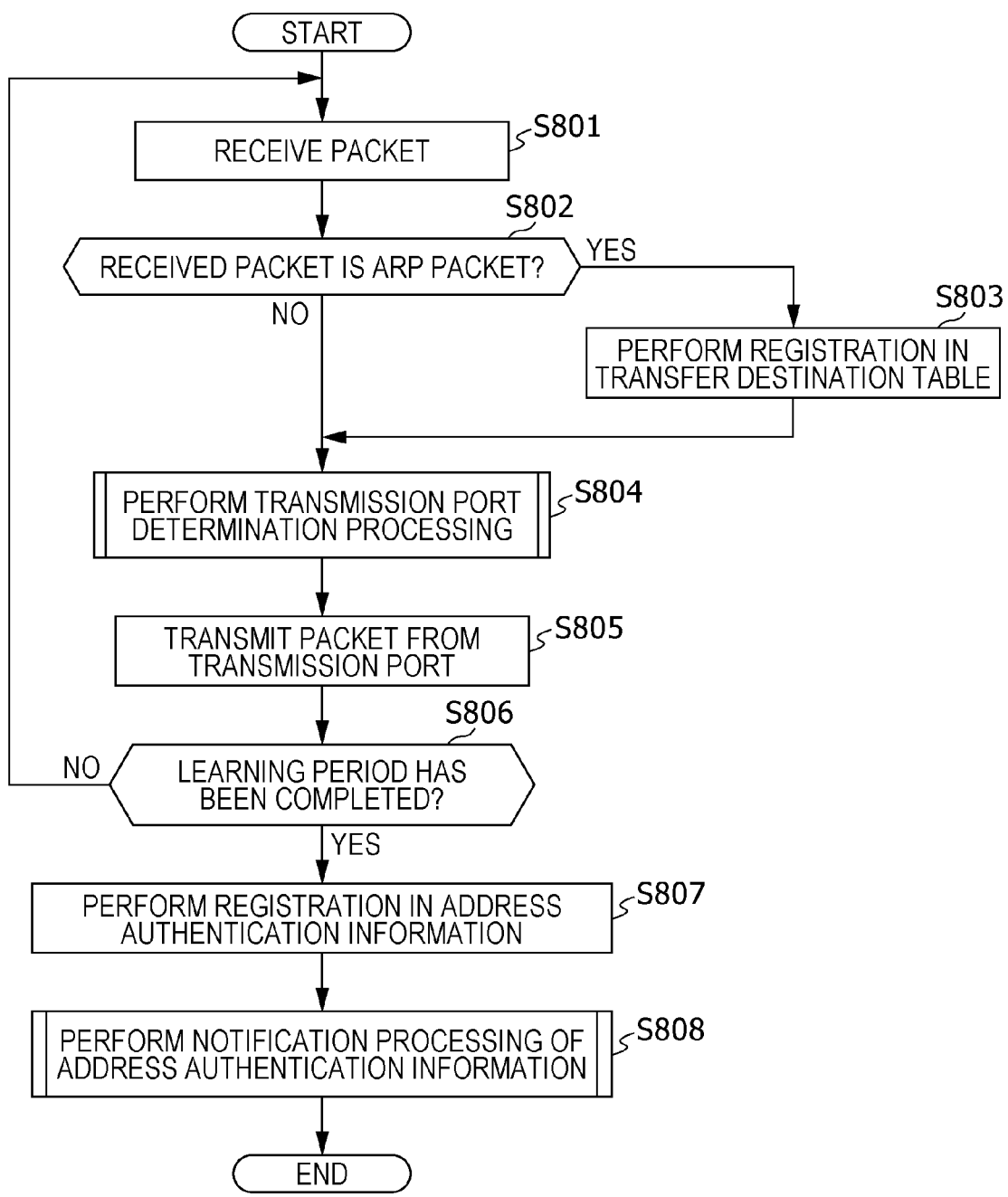
FIG. 11 is a flowchart illustrating processing performed by the secure hub for registering the address authentication information according to the embodiment.

FIG. 11 is a flowchart illustrating the processing for registering the address authentication information performed by the secure hub 102 according to the embodiment. It should be noted that, although only the processing performed by the secure hub 102 is described here, the description is also applicable to the secure hub 104. The same holds for the following descriptions.

In step S801, the secure hub 102 waits until receiving a packet via any of the ports P1, P2, P3, and P4. After a packet is received via any of the ports P1, P2, P3, and P4, the transfer processing unit 204 transfers the received packet to the packet transfer control unit 202.

In step S802, the packet transfer control unit 202 determines whether the packet received in step S801 is an ARP packet. In a case where the packet is an ARP packet (YES in step S802), the packet transfer control unit 202 performs the processing in step S803. In a case where the packet is not an ARP packet (NO in step S802), the packet transfer control unit 202 performs the processing in step S804.

In step S803, the packet transfer control unit 202 extracts the IP address in ARP-S-IP 617, which is the source IP address of the ARP packet, and the MAC address in ARP-S-MAC 616, which is the source MAC address, and registers in the transfer destination table 211 the source IP address and the source MAC address together with the port number of the port by which the ARP packet is received.

The source MAC address may be extracted from S-MAC 604 of the Ethernet (registered trademark) frame 600 instead of ARP-S-MAC 616 of the ARP packet 610.

In step S804, the packet transfer control unit 202 determines a transmission port so as to send the packet to a communication partner and notifies the transfer processing unit 204 of the port ID of the determined transmission port. The details of the processing in step S804 will be described later.

In step S805, the transfer processing unit 204 transmits the packet from the transmission port in accordance with the port ID reported in step 3804.

In step S806, the packet transfer control unit 202 determines whether a learning period for learning the transfer status of the packet has been completed. In a case where it is determined that the learning period has not been completed (NO in step S806), the processing flow returns to step S801. In a case where it is determined that the learning period has been completed (YES in step S806), the packet transfer control unit 202 performs the processing in step 3807.

In step S807, the packet transfer control unit 202 registers the address authentication information 210 by employing the transfer destination table 211. The packet transfer control unit 202 extracts a pair of a trusted MAC address and a trusted IP address from the transfer destination table 211. More specifically, the packet transfer control unit 202 extracts a pair whose MAC address is the only MAC address associated with a given single port from the pairs of the MAC address 402 and the IP address 403 associated with the port ID 401, the pairs being registered in the transfer destination table 211 (see FIG. 4). The packet transfer control unit 202 regards the extracted pair of the MAC address and the IP address, only this MAC address being associated with the given port, as a pair of a trusted MAC address and a trusted IP address and registers in the address authentication information 210 the extracted pair in association with the hardware device ID of the secure hub 102 and the port ID of the given single port extracted with the pair.

The packet transfer control unit 202 may extract multiple pairs if a single MAC address is associated with multiple pairs. The packet transfer control unit 202 may then regard the extracted pairs as pairs of a trusted MAC address and a trusted IP address and registers in the address authentication information 210 the extracted multiple pairs in association with the hardware device ID of the secure hub 102 and the port ID extracted with the pair.

As described above, the packet transfer control unit 202 regards a pair whose MAC address is the only MAC address associated with a given single port as a pair of a trusted MAC address and a trusted IP address. The reason is that, when a single MAC address is associated with a single port, it is assumed that a legitimate terminal is connected to the single port; in other words, no illegitimate terminal is connected to the single port. The assumption can be made because, if an illegitimate terminal is connected to a port, the illegitimate terminal is connected via a hub or the like to a LAN cable to which a legitimate terminal is connected, and thus multiple MAC addresses are associated with the port.

If an illegitimate terminal is newly connected to a port (also referred to as a free port) of a secure hub to which no device has been connected, a single MAC address is associated with the single port. Such a situation may, however, be prevented since a free port may be physically blocked in advance during, for example, network construction so that the free port is protected and no LAN cable can be inserted.

The packet transfer control unit 202 registers in the address authentication information 210 "auto" as the method 503 and "n/a" as the sequence ID 504.

In step S808, the secure hub 102 reports the address authentication information 210 registered in step S807 to another secure hub. The details of the processing in step S808 will be described later.

The registration is not limited to registering in the address authentication information 210 a pair whose MAC address is the only MAC address associated with a given single port as described above, and a pair associated with a port that s set by an administrator as a trusted port may also be registered in the address authentication information 210. The setting performed by an administrator is done by using the setting input unit 209.

Figure 12:
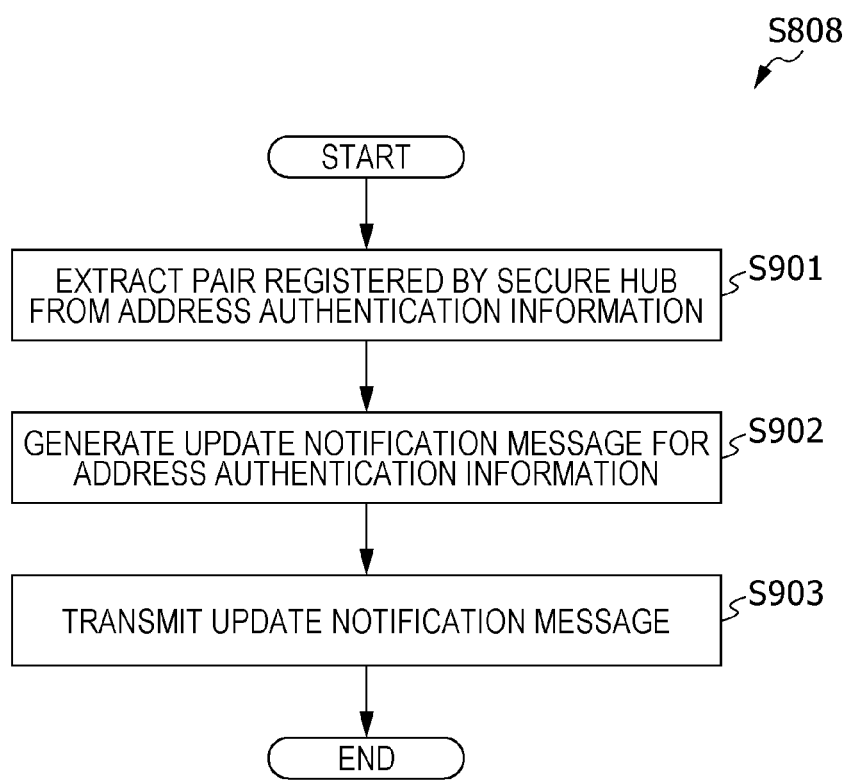
FIG. 12 is a flowchart illustrating processing performed by the secure hub according to the embodiment for reporting the address authentication information to another secure hub.

Next, the details of the processing in step S808 will be described. FIG. 12 is a flowchart illustrating processing performed by a secure hub according to the embodiment for reporting the address authentication information 210 to another secure hub.

In step S901, the packet transfer control unit 202 extracts from the address authentication information 210 the pair registered by the secure hub 102. More specifically, the packet transfer control unit 202 extracts from the address authentication information 210 a pair associated with the hardware device ID 501 identical to the hardware device ID of the secure hub 102.

In step S902, the packet transfer control unit 202 generates the update notification message 700 for the address authentication information 210 containing the pair extracted in step S901. The packet transfer control unit 202 subsequently stores the generated update notification message 700 in Payload 606 of the Ethernet (registered trademark) frame 600.

In step S903, the packet transfer control unit 202 broadcasts the Ethernet (registered trademark) frame 600 generated in step S902 from all ports via the transfer processing unit 204.

Figure 13:
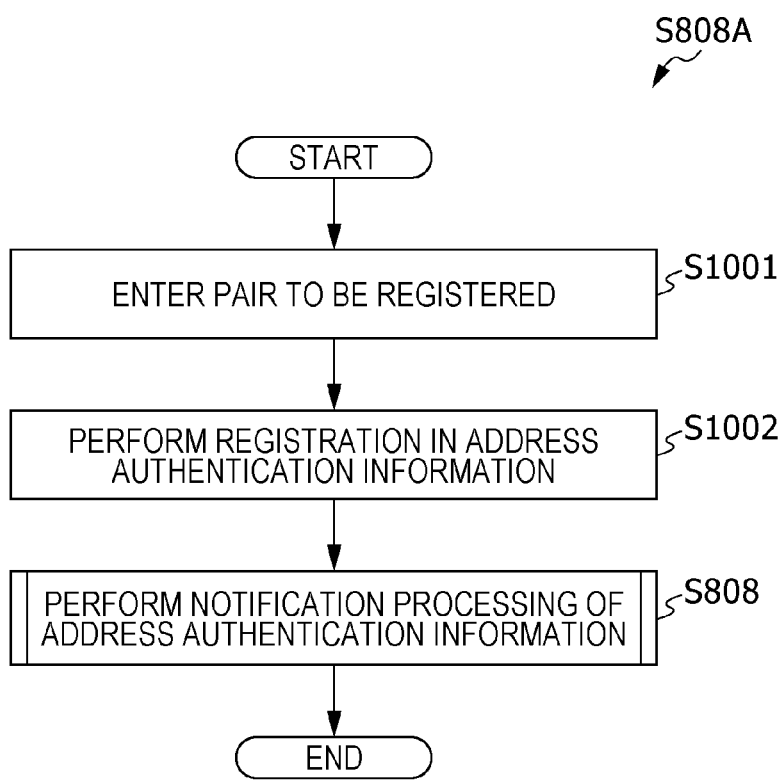
FIG. 13 is a flowchart illustrating processing in a case of manually setting the address authentication information according to the embodiment.

FIG. 13 is a flowchart illustrating processing in a case where an administrator manually sets the address authentication information 210 according to the embodiment. Step S808A, which is a series of processing operations illustrated in FIG. 13, is encompassed in the processing in step S808 illustrated in FIG. 11.

In step S1001, a pair of a trusted MAC address and a trusted IP address, and an associated port ID are entered into the setting input unit 209 of the secure hub 102 by an administrator.

In step S1002, the setting input unit 209 registers in the address authentication information 210 the pair of the trusted MAC address and the trusted IP address, and the associated port ID entered in step S1001. The setting input unit 209 registers in the address authentication information 210 "manual" as the method 503 and "n/a" as the sequence ID 504.

In step S808, the secure hub 102 notifies another secure hub of the address authentication information 210 registered in step S1002. Step S808 is the same as in FIG. 11.

7-2. Packet Transfer Processing

Figure 14:
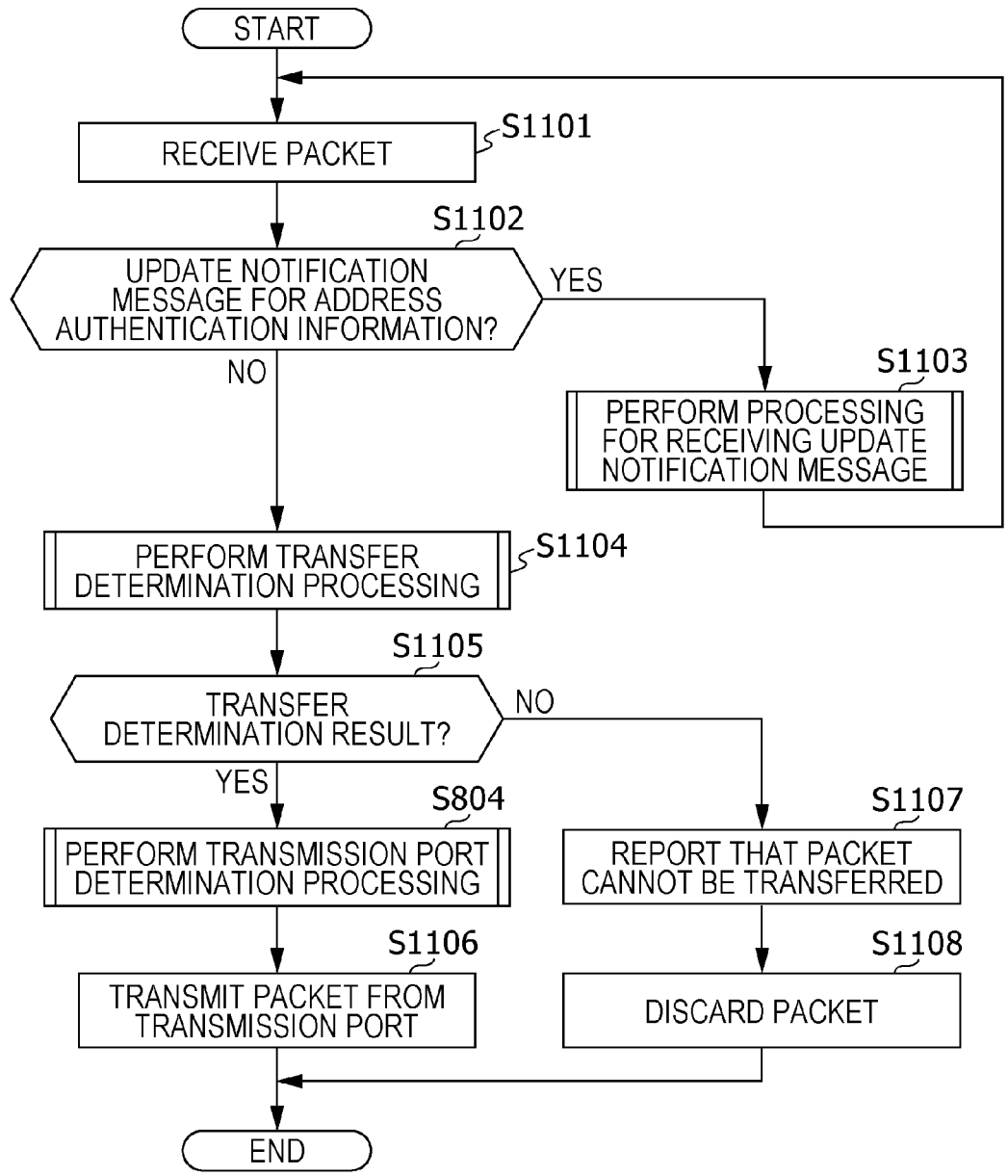
FIG. 14 is a flowchart illustrating transfer processing for a received packet according to the embodiment.

Next, transfer processing of a received packet performed by a secure hub will be described in detail. FIG. 14 is a flowchart illustrating transfer processing of a received packet according to the embodiment.

In step S1101, the secure hub 102 waits until receiving a packet via any of the ports P1, P2, P3, and P4. After a packet is received via any of the ports P1, P2, P3, and P4, the transfer processing unit 204 transfers the received packet to the packet transfer control unit 202.

In step S1102, the packet transfer control unit 202 determines whether the packet received in step S1101 contains the update notification message 700 for the address authentication information 210. In a case where the update notification message 700 for the address authentication information 210 is contained (YES in step S1102), the packet transfer control unit 202 performs the processing in step S1103. In a case where the update notification message 700 for the address authentication information 210 is not contained (NO in step S1102), the packet transfer control unit 202 performs the processing in step S1104.

In step S1103, the packet transfer control unit 202 performs the processing for receiving the update notification message 700 for the address authentication information 210 contained in the packet received in step S1101. The details of the processing in step S1103 will be described later.

In step 31104, the packet transfer control unit 202 determines whether the packet received in step S1101 can be transferred. The details of the processing in step S1104 will be described later.

In step S1105, in a case where it is determined in step 31104 that the packet can be transferred (YES in step S1105), the packet transfer control unit 202 performs the processing in step S804. In a case where it is determined that the packet cannot be transferred (NO in step S1105), the packet transfer control unit 202 performs the processing in step S1107.

In step S804, the packet transfer control unit 202 determines a transmission port so as to send the packet to a communication partner and notifies the transfer processing unit 204 of the port ID of the determined transmission port.

In step S1105, the transfer processing unit 204 transmits the packet from a transmission port according to the port ID reported in step S804.

In step S1107, the packet transfer control unit 202 displays that the packet received in step S1101 cannot be transferred or reports that to another hardware device.

In step S1108, the transfer processing unit 204 discards the packet received in step S1101.

It should be noted that the method for reporting that the packet received in step S1101 cannot be transferred is not particularly limited in this embodiment. For example, if the secure hub 102 is equipped with a monitor, the notification may be displayed on the monitor. The notification may be visually presented such that the notification that the packet cannot be transferred is reported, by employing, for example, Simple Network Management Protocol (SNMP) communication defined by RFC 3411, to other equipment such as a rotating light and the rotating light accordingly rotates and emits light.

7-3. Update Processing of Address Authentication Information

Figure 15:
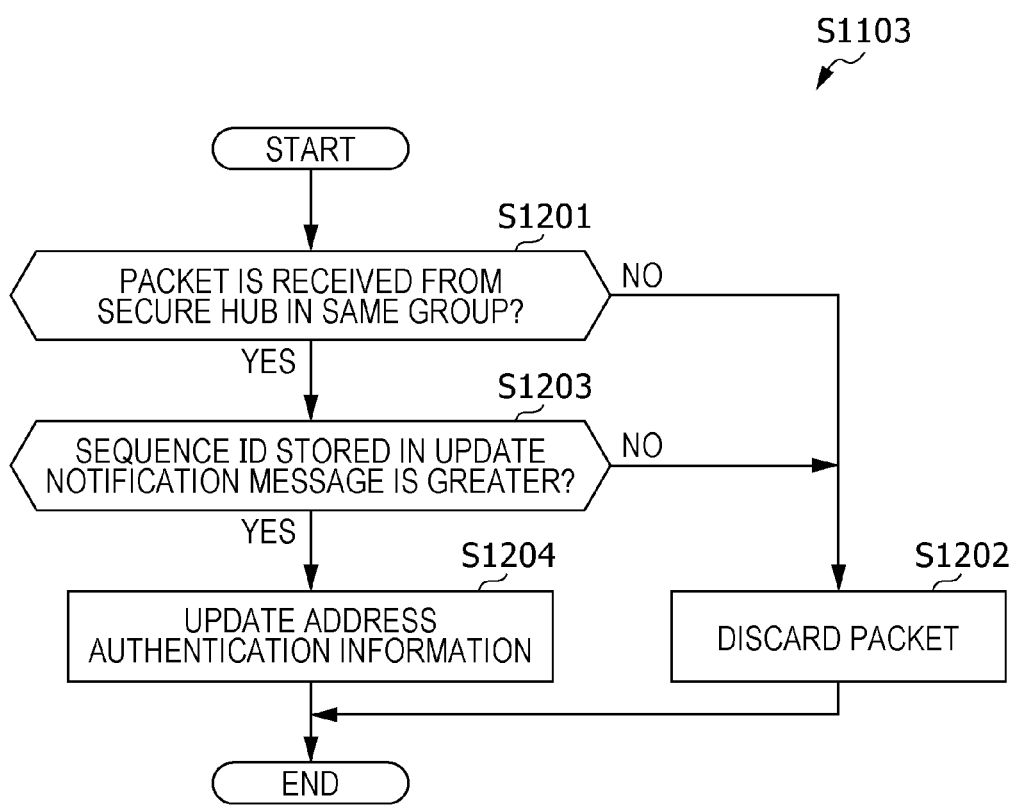
FIG. 15 is a flowchart illustrating update processing for the address authentication information according to the embodiment.

Next, the details of the processing in step S1103 will be described. FIG. 15 is a flowchart illustrating update processing of the address authentication information 210.

In step S1201, the packet transfer control unit 202 obtains from the group key information 213 the group key for the group to which the secure hub 102 belongs and determines whether the update notification message 700 received in step S1101 is reported by a secure hub in the same group. More specifically, in a case where the authentication information generated by a HMAC algorithm by using the group key of the secure hub 102 matches the value of Message Authentication Code 706 stored in the update notification message 700, the packet transfer control unit 202 determines that the update notification message 700 received in step S1101 is reported by a secure hub in the same group. In a case where the authentication information does not match the value of Message Authentication Code 706, the packet transfer control unit 202 determines that the update notification message 700 received in step S1101 is not reported by a secure hub in the same group.

In a case where it is determined that the update notification message 700 received in step S1101 is not reported by a secure hub in the same group (NO in step S1201), the packet transfer control unit 202 performs the processing in step S1202. Conversely, in a case where it is determined that the update notification message 700 received in step S1101 is reported by a secure hub in the same group (YES in step S1201), the packet transfer control unit 202 performs the processing in step S1203.

In step S1202, the packet transfer control unit 202 discards the packet received in step S1101.

In step S1203, the packet transfer control unit 202 obtains Switch ID 703 stored in the update notification message 700 received in step S1101. Next, the packet transfer control unit 202 extracts from the address authentication information 210 a pair associated with the hardware device ID 501 identical to Switch ID 703. The packet transfer control unit 202 then determines whether the value in Sequence ID 702 stored in the update notification message 700 is greater than the value of the sequence ID 504 associated with the extracted pair. In a case where it is determined that the value in Sequence ID 702 is greater than the value of the sequence ID 504 (YES in step S1203), the packet transfer control unit 202 performs the processing in step S1204. In a case where it is determined that the value in Sequence ID 702 is not greater than the value of the sequence ID 504 (NO in step S1203), the packet transfer control unit 202 performs the processing in step S1202.

In step S1204, the packet transfer control unit 202 deletes from the address authentication information 210 the pair extracted from the address authentication information 210 in step S1203 and newly registers in the address authentication information 210 Entry 705 stored in the update notification message 700. The value in Switch ID 703 and the value in Sequence ID 702 are respectively stored as the hardware device ID 501 and the sequence ID 504.

7-4. Packet Transfer Determination Processing

Figure 16:
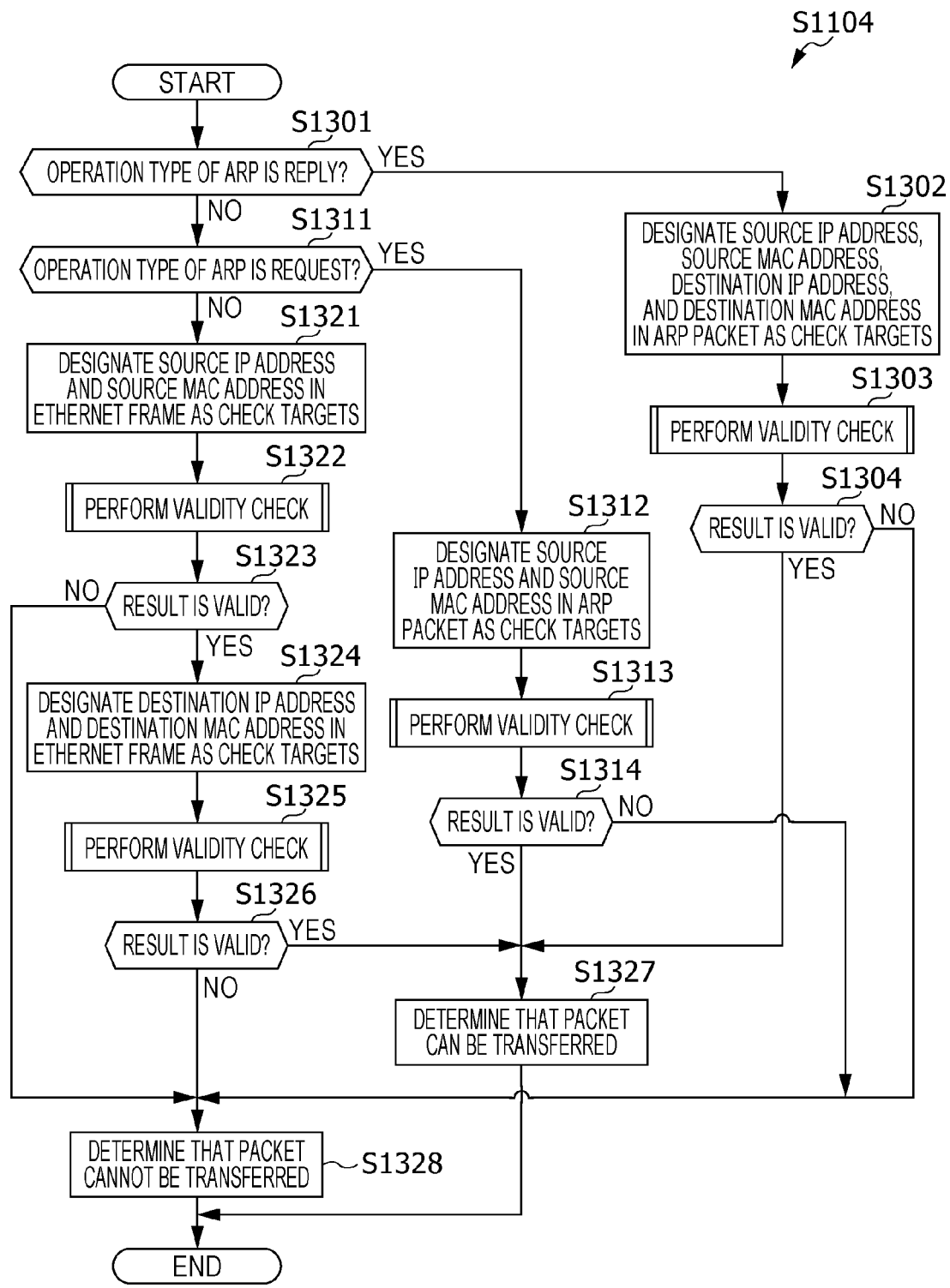
FIG. 16 is a flowchart illustrating transfer determination processing for a received packet according to the embodiment.

Next, the details of the processing in step S1104 will be described. FIG. 16 is a flowchart illustrating transfer determination processing of a received packet.

In step S1301, the packet transfer control unit 202 determines whether the operation type (Operation 615) of ARP of the packet received in step S1101 is reply. In a case where it is determined that the operation type of ARP is reply (YES in step S1301), the packet transfer control unit 202 performs the processing in step S1302. In a case where it is determined that the operation type of ARP is not reply (NO in step S1301), the packet transfer control unit 202 performs the processing in step S1311.

If the packet received in step S1101 is not ARP packet, the processing in a case where it is determined that the operation type of ARP is not reply is performed.

In step S1302, in order to perform a validity check for ARP packet contained in an Ethernet (registered trademark) frame, ARP-S-MAC 616 and ARP-S-IP 617, and ARP-D-MAC 618 and ARP-D-IP 619, which are stored in the ARP packet, are designated by the packet transfer control unit 202 as targets for validity check.

In step S1303, the packet transfer control unit 202 performs a validity check for ARP packet on the check targets designated in step S1302. The details of the validity check will be described later.

In step S1304, the packet transfer control unit 202 obtains the result of validity check for ARP-S-MAC 616 and ARP-S-IP 617 that are designated as check targets and the result of validity check for ARP-D-MAC 618 and ARP-D-IP 619 that are designated as check targets. In a case where it is determined that both the results of validity check are valid (YES in step S1304), the packet transfer control unit 202 performs the processing in step S1327. In a case where it is determined that at least one of the results of validity check is invalid (NO in step 31304), the packet transfer control unit 202 performs the processing in step S1328.

In step S1311, the packet transfer control unit 202 checks whether the operation type of ARP of the packet received in step S1101 is request. In a case where the operation type of ARP is request (YES in step S1311), the packet transfer control unit 202 performs the processing in step S1312. In a case where the operation type of ARP is not request (NO in step S1311), the packet transfer control unit 202 performs the processing in step S1321.

If the packet received in step S1101 is not ARP packet, the processing in a case where it is determined that the operation type of ARP is not reply is performed.

In step S1312, in order to perform a validity check for ARP packet contained in an Ethernet (registered trademark) frame, ARP-S-MAC 616 and ARP-S-IP 617, which are stored in the ARP packet, are designated by the packet transfer control unit 202 as targets for validity check.

In step S1313, the packet transfer control unit 202 performs a validity check for ARP packet on the check targets designated in step S1312. The details of the processing in step S1313 are the same as those of step S1303.

In step S1314, the packet transfer control unit 202 obtains the result of validity check for ARP-S-MAC 616 and ARP-S-IP 617 that are designated as check targets in step 31312. In a case where it is determined that the result of validity check is valid (YES in step S1314), the packet transfer control unit 202 performs the processing in step S1327. In a case where it is determined that the result of validity check is invalid (NO in step S1314), the packet transfer control unit 202 performs the processing in step S1328.

In step S1321, in order to perform a validity check for Ethernet (registered trademark) frame, S-MAC 604 and Source IP Address 1702 are designated by the packet transfer control unit 202 as targets for validity check.

In step S1322, the packet transfer control unit 202 performs a validity check on the check targets designated in step S1321. The details of the processing in step S1322 are the same as those of step S1303.

In step S1323, the packet transfer control unit 202 obtains the result of validity check for S-MAC 604 and Source IP Address 1702 that are designated as check targets in step S1321. In a case where it is determined that the result of validity check is valid (YES in step S1323), the packet transfer control unit 202 performs the processing in step S1324. In a case where it is determined that the result of validity check is invalid (NO in step S1323), the packet transfer control unit 202 performs the processing in step S1328.

In step S1324, in order to perform a validity check for Ethernet (registered trademark) frame, D-MAC 603 and Destination IP Address 1703 are designated by the packet transfer control unit 202 as targets for validity check.

In step S1325, the packet transfer control unit 202 performs a validity check on the check targets designated in step S1324. The details of the processing in step S1325 are the same as those of step S1303.

In step S1326, the packet transfer control unit 202 obtains the result of validity check for D-MAC 603 and Destination IP Address 1703 that are designated as check targets in step S1324. In a case where it is determined that the results of validity check is valid (YES in step S1326), the packet transfer control unit 202 performs the processing in step S1327. In a case where it is determined that the result of validity check is invalid (NO in step S1326), the packet transfer control unit 202 performs the processing in step S1328.

In step S1327, the packet transfer control unit 202 determines that the packet received in step S1101 can be transferred.

In step S1328, the packet transfer control unit 202 determines that the packet received in step S1101 cannot be transferred.

7-5. Validity Check Processing

Figure 17:
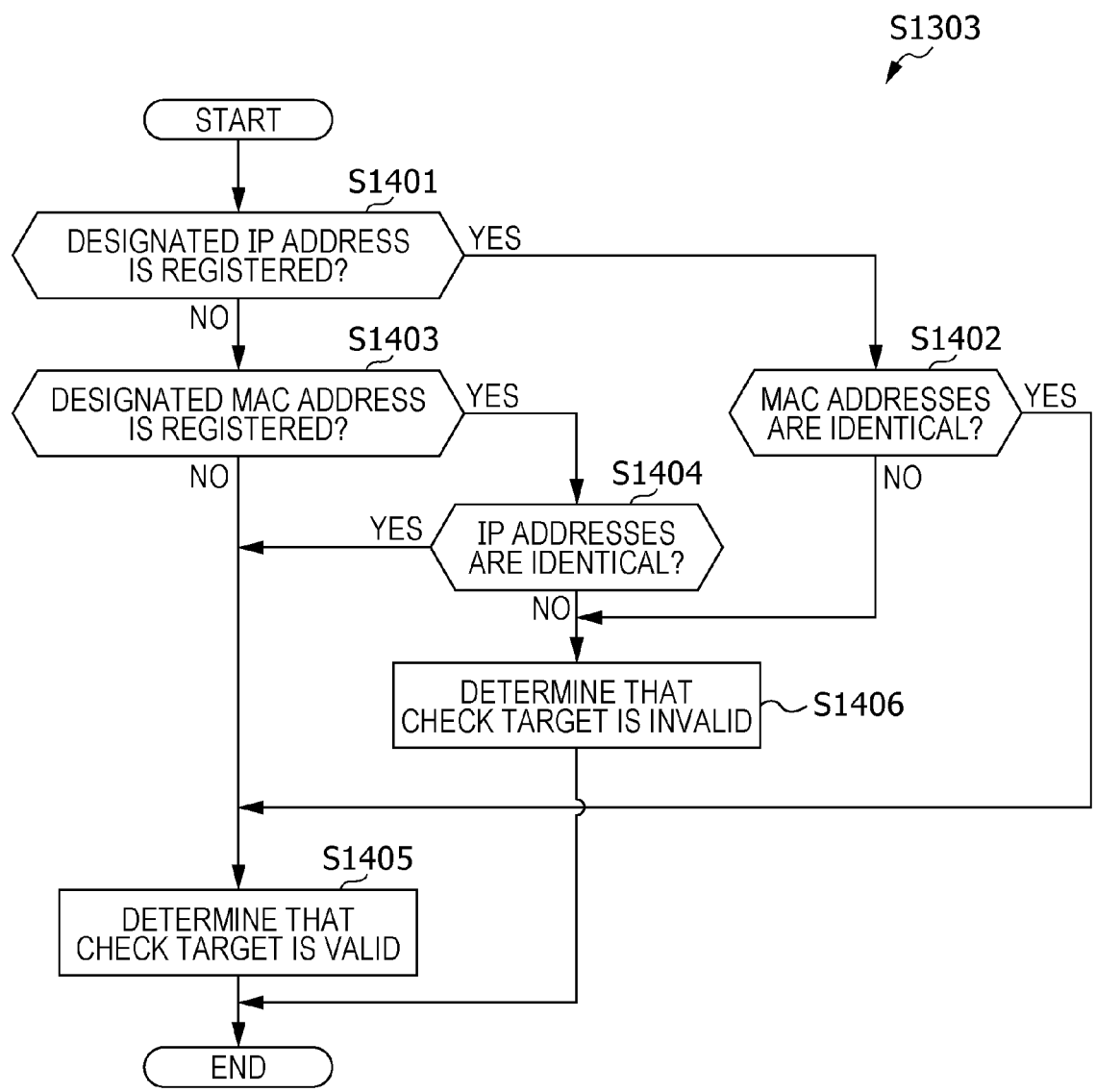
FIG. 17 is a flowchart illustrating validity check processing for a packet according to the embodiment.

Next, validity check processing for a received packet will be described, FIG. 17 is a flowchart illustrating validity check processing for a received packet according to the embodiment. The processing illustrated in FIG. 17 shows the details of the processing in step S1303 in FIG. 16.

In step S1401, the packet transfer control unit 202 determines whether a pair having an IP address identical to the IP address designated as a check target is registered in the address authentication information 210. In a case where it is determined that such a pair is registered in the address authentication information 210 (YES in step S1401), the packet transfer control unit 202 performs the processing in step S1402. In a case where it is determined that such a pair is not registered in the address authentication information 210 (NO in step S1401), the packet transfer control unit 202 performs the processing in step S1403.

In step S1402, the packet transfer control unit 202 determines whether the MAC address included in the pair having the IP address identical to the IP address designated as a check target matches the MAC address designated as a check target. In a case where it is determined that both the MAC addresses are identical (YES in step S1402), the packet transfer control unit 202 performs the processing in step S1405. In a case where it is determined that both the MAC addresses are not identical (NO in step S1402), the packet transfer control unit 202 performs the processing in step S1406.

In step S1403, the packet transfer control unit 202 determines whether a pair having a MAC address identical to the MAC address designated as a check target is registered in the address authentication information 210. In a case where it is determined that such a pair is registered in the address authentication information 210 (YES in step S1403), the packet transfer control unit 202 performs the processing in step S1404. In a case where it is determined that such a pair is not registered in the address authentication information 210 (NO in step S1403), the packet transfer control unit 202 performs the processing in step S1405.

In step S1404, the packet transfer control unit 202 determines whether the IP address included in the pair having the MAC address identical to the MAC address designated as a check target matches the IP address designated as a check target. In a case where it is determined that both the IP addresses are identical (YES in step S1404), the packet transfer control unit 202 performs the processing in step S1405. In a case where it is determined that both the IP addresses are identical (NO in step S1404), the packet transfer control unit 202 performs the processing in step S1406.

In step S1405, the packet transfer control unit 202 determines that the check target is valid.

In step S1406, the packet transfer control unit 202 determines that the check target is invalid.

If a new IP address is assigned to a network interface card of a hardware device, multiple IP addresses are registered for a single MAC address. As a result, even though it is supposed to be determined that the received Ethernet (registered trademark) frame is valid, it is determined that the received Ethernet (registered trademark) frame is invalid.

In order to avoid such a case, the address authentication information 210 is updated before the validity check processing.

More specifically, in a case where the operation type of ARP is reply (YES in step S1301), if a pair that is associated with the port ID 502 of the port having received an ARP packet and that is associated with the method 503 of "auto" does not exist in the address authentication information 210, the packet transfer control unit 202 newly registers in the address authentication information 210 ARP-S-MAC 616 and ARP-S-IP 617 as a trusted MAC address and a trusted IP address.

Furthermore, if a pair that is associated with the port ID 502 of the port having received an ARP packet and that is associated with the method 503 of "auto" already exists in the address authentication information 210, in a case where ARP-S-MAC 616 in the received ARP packet matches the MAC address 505, ARP-S-MAC 616 and ARP-S-IP 617 are registered in the address authentication information 210 as a trusted MAC address and a trusted IP address. This is because it is considered that a new IP address needs to be added.

Moreover, in a case where ARP-S-MAC 616 in the received ARP packet does not match the MAC address 505, it is determined that a new hardware device is connected via a hub, and a pair that is associated with the port ID 502 of the port and the method 503 of "auto" is deleted from the address authentication information 210.

7-6. Transmission Port Determination Processing

Figure 18:
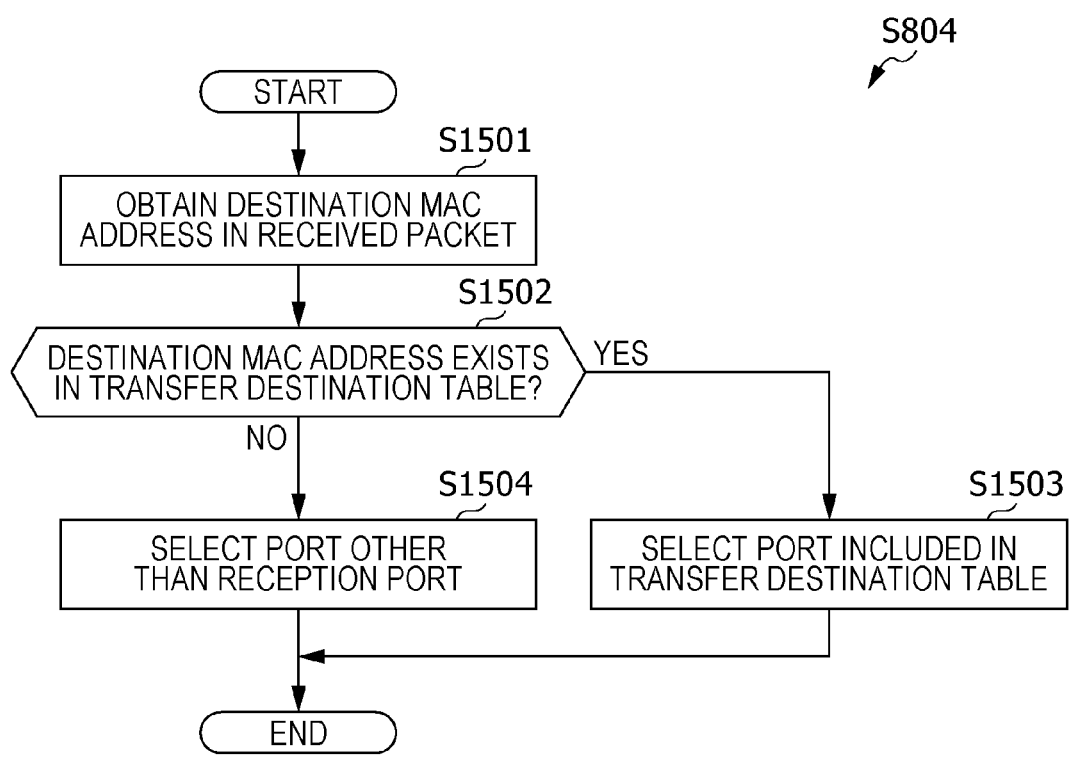
FIG. 18 is a flowchart illustrating processing for determining a transmission port for a received packet according to the embodiment.

Next, the processing for determining a transmission port for a received packet will be described in detail. FIG. 18 is a flowchart illustrating the processing for determining a transmission port for a received packet according to the embodiment.

In step S1501, the transfer processing unit 204 obtains D-MAC 603 that is the destination MAC address of the packet received in step S1101.

In step S1502, the transfer processing unit 204 determines whether a pair including the MAC address 402 identical to D-MAC 603 exists in the transfer destination table 211. In a case where it is determined that such a pair exists in the transfer destination table 211 (YES in step S1502), the transfer processing unit 204 performs the processing in step S1503. In a case where it is determined that such a pair does not exist in the transfer destination table 211 (NO in step S1502), the transfer processing unit 204 performs the processing in step S1504.

In step S1503, the transfer processing unit 204 selects as a transmission port the port of the port ID 401 associated with the pair including the MAC address 402 identical to D-MAC 603 in the transfer destination table 211.

In step S1504, the transfer processing unit 204 selects as a transmission port a port other than the port through which the packet is received in step S1101.

8. Advantages of Embodiment

In this embodiment, the secure hub 102 generates the address authentication information 210 storing the correspondence between a trusted MAC address and a trusted IP address and shares the address authentication information 210 with the other secure hub 104. According to the address authentication information 210, the secure hubs 102 and 104 determine whether a received packet can be transferred and transfer only the packet capable of being transferred. The secure hub 102 is connected to a hardware device to be protected, for example, the SCADA device 112, and collects the trusted MAC address and the trusted IP address of the SCADA device 112. The collected MAC address and IP address are shared with the secure hub 104 in the distance, thereby preventing transfer of a packet transmitted from the PC114 masquerading as the SCADA device 112 to a hardware device (for example, the PLC 115) connected to the secure hub 104.

This corresponds to preventing illegitimate communication performed such that the communication device TC illustrated in FIG. 1 transmits to the communication device TA the packet PC in which the source IP address is spoofed as the address of the communication device TB.

Therefore, communication among hardware devices can be secured by merely connecting the secure hub according to the embodiment to hardware devices to be protected, resulting in improving security while suppressing the investment cost by maintaining part of facilities in the existing communication network.

9. Other Modified Examples it should be noted that the present disclosure has been described above on the bases of the embodiment, but the present disclosure is not limited to the above-described embodiment. The cases described below are also encompassed in the present disclosure.

(1) The case of employing IP communication on Ethernet is used as an example in the above description of the embodiment, but the implementation is not limited to this. For example, a network model in which a protocol, such as the ARP, for resolving address information between two layers, such as the relationship between the data link layer and the network layer of the OSI model, exists may be applied.

(2) The case of securing data communication among hardware devices installed in a factory is used as an example in the above description of the embodiment, but the implementation is not limited to this. For example, the case of securing communication among electro control units (ECU) provided to an automobile may be applied.

(3) A fixed IP address is assigned in advance to a hardware device in the above description of the embodiment, but the implementation is not limited to this. The Dynamic Host Configuration Protocol (DHCP), by which an IP address is automatically assigned when a hardware device is connected to a communication network, may be applied. In this case, the secure hub may also monitor communication with the DHCP and generate the address authentication information in accordance with information of an IP address given to each of the hardware devices and a MAC address.

(4) The update notification message 700 for the address authentication information is broadcast in the above description of the embodiment, but the implementation is not limited to this. The update notification message 700 for the address authentication information may be unicasted by using retained IP addresses of all secure hubs sharing the address authentication information.

(5) The apparatuses according to the embodiment may be partly or wholly constituted by a system large scale integration (LSI: large scale integrated circuit). The system LSI is an ultra-multifunction LSI manufactured by integrating multiple components on one chip, more specifically, a computer system including, for example, a microprocessor, a ROM, and a RAM. A computer program is stored in the RAM. The function of the system LSI can be achieved by the microprocessor's operation according to the computer program.

Furthermore, the components constituting the above-described apparatuses may each be made into an individual chip or may be made into a chip including part or all of the components.

The system LSI is used here as an example, but it may be referred to as integrated circuit (IC), LSI, super LSI, or ultra LSI depending on the level of integration. The method of implementing the integrated circuit is not limited to LSI, but may be implemented as a dedicated circuit or a general processor. A Field Programmable Gate Array (FPGA) that is programmable after manufacturing of the LSI or a reconfigurable processor in which connection or setting of circuit cells in the LSI can be reconfigured after manufacturing of LSI may be employed.

If an integrated-circuit technology that would replace the LSI emerges due to the progress of the semiconductor technology or a derivative related technology, the technique may be used for integrating functional blocks. Biotechnology may possibly be applicable.

(6) The components constituting the apparatuses may be partially or wholly implemented as an IC card or a single module that are detachable from the apparatuses. The IC card or the module is a computer system constituted by a microprocessor, a ROM, a RAM, and the like. The IC card or the module may include the aforementioned ultra-multifunction LSI. The function of the IC card or the module can be achieved by the microprocessor's operation according to the computer program. The IC card or the module may have tamper resistance.

(7) The present disclosure may be the above-described method. Furthermore, the present disclosure may be a computer program that implements the method by using a computer or digital signals constituting a computer program.

Moreover, the present disclosure may be a computer-readable storage medium, such as a flexible disk, a hard disk, a CD-ROM, an MO, a DVD, a DVD. ROM, a DVD-RAM, a Blu-ray (registered trademark) Disc (BD), or a semiconductor memory, storing a computer program or digital signals. In addition, the present disclosure may be digital signals recorded in such a storage medium.

Further, the present disclosure may transmit a computer program or digital signals through an electric communication line, a wireless or a wired communication line, a network represented by the Internet, data broadcasting, or the like.

Furthermore, the present disclosure may be a computer system including a memory storing a computer program and a microprocessor that operates in accordance with the computer program.

Moreover, the program or the digital signals may be transported by using a storage medium storing the program or the digital signals or transported via a network or the like, so that the program or the digital signals may be utilized in another individual computer system.

In the embodiment, the components may each be constituted by a dedicated hardware component or implemented by executing a suitable software program for each component. The components may be implemented such that a program execution unit, such as a central processing unit (CPU) or a processor, reads out and executes a software program stored in a storage medium, such as a hard disk or a semiconductor memory. Here, the software that implements the communication security apparatus or the like according to the embodiment is the program described below.

The program causes a computer to execute a control method for communication security apparatus including a memory that retains address authentication information containing addresses of one or more devices. The control method includes performing communication for receiving a packet from a first device and transmitting the received packet to a second device, and performing control for determining whether addresses of the second device contained in the packet are included in the address authentication information and discarding the packet in a case where it is determined that the addresses of the second device are not included in the address authentication information.

The communication security apparatus or the like according to one or more aspects of the present disclosure has been described on the basis of the embodiment. The present disclosure is, however, not limited to the embodiment. Without departing from the spirit and scope of the present disclosure, various modifications to the embodiment and combinations of components in the different embodiment, which are apparent to those skilled in the art, may be embraced within the range of one or more aspects of the present disclosure.

The present disclosure is beneficial to a communication security apparatus for preventing attacks that attempt illegitimate data acquisition via a network and a method for controlling such a communication security apparatus.

What is claimed is:

1. A communication security apparatus, comprising:
   a communicator that receives a packet from a first device and that transmits the received packet to a second device, the communicator including a plurality of ports configured to connect a plurality of devices, including the first device and the second device;
   a memory that retains address authentication information containing pairs of a physical address and a logical address of one or more devices,
   wherein after a learning period of receiving and transmitting packets,
      in a case where one device is associated with one port, one or more pairs of a physical address and a logical address of the one device is registered in the address authentication information as a trusted pair together with a port ID of the one port, and
      in a case where at least two devices are associated with the one port, a pair of a physical address and a logical address of each of at least two devices are not registered in the address authentication information; and
   a controller
      that determines whether a pair of a physical address and a logical address of the first device and a pair of a physical address and a logical address of the second device each match any one of the pairs of the physical address and the logical address of the one or more devices when the address authentication information includes a physical address or a logical address of each of the first device and the second device contained in the packet, and
      that discards the packet in a case where it is determined that the pair of the physical address and the logical address of the first device and the pair of the physical address and the logical address of the second device do not match any one of the pairs of the physical address and the logical address of the one or more devices.

2. The communication security apparatus according to claim 1,
   wherein the memory further retains a group key shared with another communication security apparatus different from the communication security apparatus, and
   the controller receives via the communicator an update notification message containing addresses of a third device and message authentication information from the other communication security apparatus and, in a case where authentication information generated by a given algorithm by using the group key matches the message authentication information, updates the address authentication information by adding the addresses of the third device contained in the update notification message to the address authentication information.

3. The communication security apparatus according to claim 1,
   wherein the controller transmits via the communicator the address authentication information to another communication security apparatus different from the communication security apparatus.

4. The communication security apparatus according to claim 3,
   wherein the address authentication information contains pairs of addresses of the one or more devices and sequence IDs respectively associated with the pairs, and
   the controller includes in the address authentication information a sequence ID that is incremented every time the address authentication information is transmitted to the another communication security apparatus via the communicator.

5. The communication security apparatus according to claim 1,
   wherein the controller collects addresses of a device communicable with the communicator and updates the address authentication information in accordance with the collected addresses.

6. The communication security apparatus according to claim 5,
   wherein the address authentication information contains a pair of a media access control (MAC) address and an Internet Protocol (IP) address, and
   in a case where, when the address authentication information is updated, a specific IP address is associated with only one pair of the collected addresses including the MAC address, the controller updates the address authentication information by adding the one pair to the address authentication information.

7. A control method for a communication security apparatus including a memory that retains address authentication information containing addresses of one or more devices, comprising:
   performing communication, by a communicator, for receiving a packet from a first device and transmitting the received packet to a second device, the communicator including a plurality of ports configured to connect a plurality of devices, including the first device and the second device, wherein after a learning period of receiving and transmitting packets, in a case where one device is associated with one port, registering one or more pairs of a physical address and a logical address of the one device in address authentication information in a memory as a trusted pair together with a port ID of the one port, and in a case where at least two devices are associated with the one port, not registering a pair of a physical address and a logical address of each of at least two devices in the address authentication information in the memory;

performing control for determining whether a pair of a physical address and a logical address of the first device and a pair of a physical address and a logical address of the second device each match any one of the pairs of the physical address and the logical address of the one or more devices when the address authentication information includes a physical address or a logical address of each of the first device and the second device contained in the packet; and performing control for discarding the packet in a case where it is determined that the pair of the physical address and the logical address of the first device and the pair of the physical address and the logical address of the second device do not match any one of the pairs of the physical address and the logical address of the one or more devices.

8. A non-transitory storage medium storing a program that causes a computer to execute a process, the process comprising:

performing communication, by a communicator, for receiving a packet from a first device and for transmitting the received packet to a second device, the communicator including a plurality of ports configured to connect a plurality of devices, including the first device and the second device, wherein after a learning period of receiving and transmitting packets, in a case where one device is associated with one port, registering one or more pairs of a physical address and a logical address of the one device in address authentication information in a memory as a trusted pair together with a port ID of the one port, and in a case where at least two devices are associated with the one port, not registering a pair of a physical address and a logical address of each of at least two devices in the address authentication information in the memory;

performing control for determining whether a pair of a physical address and a logical address of the first device and a pair of a physical address and a logical address of the second device each match any one of the pairs of the physical address and the logical address of the one or more devices when the address authentication information includes a physical address or a logical address of each of the first device and the second device contained in the packet; and performing control for discarding the packet in a case where it is determined that the pair of the physical address and the logical address of the first device and the pair of the physical address and the logical address of the second device do not match any one of the pairs of the physical address and the logical address of the one or more devices.

\* \* \* \* \*